US011747447B2

(12) United States Patent
Grosser et al.

(10) Patent No.: US 11,747,447 B2
(45) Date of Patent: Sep. 5, 2023

(54) DEVICE COMPRISING A MULTI-LAYER BODY AND A LIDAR SENSOR

(71) Applicant: Covestro Deutschland AG, Leverkusen (DE)

(72) Inventors: Ulrich Grosser, Kürten (DE); Alexander Meyer, Düsseldorf (DE); Andreas Klein, Leverkusen (DE); Dirk Hinzmann, Pulheim (DE); Peter Capellen, Krefeld (DE); Rafael Oser, Krefeld (DE); Rainer Hagen, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 428 days.

(21) Appl. No.: 16/956,984

(22) PCT Filed: Dec. 14, 2018

(86) PCT No.: PCT/EP2018/084855
§ 371 (c)(1),
(2) Date: Jun. 22, 2020

(87) PCT Pub. No.: WO2019/121347
PCT Pub. Date: Jun. 27, 2019

(65) Prior Publication Data
US 2020/0393568 A1 Dec. 17, 2020

(30) Foreign Application Priority Data
Dec. 21, 2017 (EP) ..................... 17209207

(51) Int. Cl.
| | |
|---|---|
| *G01S 7/481* | (2006.01) |
| *G02B 1/14* | (2015.01) |
| *G01S 17/931* | (2020.01) |
| *C08K 5/00* | (2006.01) |
| *C08K 5/18* | (2006.01) |
| *C08K 5/3417* | (2006.01) |
| *C08K 5/3437* | (2006.01) |
| *C08K 5/3445* | (2006.01) |
| *C08K 5/3465* | (2006.01) |
| *C08K 5/375* | (2006.01) |
| *C08L 69/00* | (2006.01) |
| *G02B 1/04* | (2006.01) |
| *C08J 7/043* | (2020.01) |
| *C08J 7/046* | (2020.01) |
| *C08J 7/05* | (2020.01) |
| *C08J 7/054* | (2020.01) |
| *C08K 3/36* | (2006.01) |
| *C09D 183/04* | (2006.01) |
| *B32B 27/36* | (2006.01) |

(52) U.S. Cl.
CPC .............. *G01S 7/4813* (2013.01); *C08J 7/043* (2020.01); *C08J 7/046* (2020.01); *C08J 7/05* (2020.01); *C08J 7/054* (2020.01); *C08K 3/36* (2013.01); *C08K 5/0041* (2013.01); *C08K 5/18* (2013.01); *C08K 5/3417* (2013.01); *C08K 5/3437* (2013.01); *C08K 5/3445* (2013.01); *C08K 5/3465* (2013.01); *C08K 5/375* (2013.01); *C08L 69/00* (2013.01); *C09D 183/04* (2013.01); *G01S 17/931* (2020.01); *G02B 1/04* (2013.01); *G02B 1/14* (2015.01); *B32B 27/365* (2013.01)

(58) Field of Classification Search
CPC ........... G01S 17/00; G01S 7/481; G02B 5/22; G02B 1/14; C08K 3/36
See application file for complete search history.

(56) References Cited

U.S. PATENT DOCUMENTS

| | | | |
|---|---|---|---|
| 3,707,397 A | 12/1972 | Gagnon | |
| 4,101,513 A | 7/1978 | Fox et al. | |
| 4,185,009 A | 1/1980 | Frietag et al. | |
| 4,278,804 A | 7/1981 | Ashby et al. | |
| 4,373,061 A | 2/1983 | Ching | |
| 4,410,594 A | 10/1983 | Olson | |
| 5,041,313 A * | 8/1991 | Patel ........................ | C08J 7/043 |
| | | | 428/412 |
| 5,367,044 A | 11/1994 | Rosenquist | |
| 5,679,820 A | 10/1997 | Pickett et al. | |
| 5,712,325 A | 1/1998 | Lewis et al. | |
| 5,817,715 A | 10/1998 | Medford | |
| 5,869,185 A | 2/1999 | Bahr et al. | |

(Continued)

FOREIGN PATENT DOCUMENTS

| | | |
|---|---|---|
| CN | 102574375 A | 7/2012 |
| CN | 105400189 A | 3/2016 |

(Continued)

OTHER PUBLICATIONS

Machine translation of JP 2008009238 (2008, 11 pages).*
Aimable (An experimental and simulation study of heteroaggregation in a binary mixture of alumina and silica colloids, Colloids and Surafees A: Physicochemical and Engineering Aspects, 2020, 605, pp. 1-10).*

(Continued)

*Primary Examiner* — Brieann R Johnston
(74) *Attorney, Agent, or Firm* — THE WEBB LAW FIRM

(57) ABSTRACT

The invention relates to a vehicle utilizing a LiDAR sensor system for driver assistance systems. A composition consisting of a thermoplastic material based on polycarbonate is used here for forming the substrate layer of a cover for the sensor with respect to the surroundings. The cover has a polysiloxane-based topcoat layer comprising a combination of organically modified silane with a silica sol, the silicon dioxide having a d90 particle size of less than 0.50 micron, in order to achieve high abrasion resistance and weathering stability.

15 Claims, 1 Drawing Sheet

(56) References Cited

U.S. PATENT DOCUMENTS

| | | | |
|---|---|---|---|
| 5,990,188 A | 11/1999 | Patel et al. | |
| 6,228,973 B1 | 5/2001 | McCloskey et al. | |
| 6,350,512 B1 | 2/2002 | Hurley et al. | |
| 2009/0284603 A1 | 11/2009 | Hsieh | |
| 2012/0177929 A1 | 7/2012 | Berstenhorst et al. | |
| 2012/0287417 A1 | 11/2012 | Mimeault | |
| 2015/0146287 A1* | 5/2015 | Kuhlmann | G02B 5/26 156/60 |
| 2016/0046838 A1* | 2/2016 | Meyer | G02B 1/04 427/160 |
| 2016/0291134 A1 | 10/2016 | Droz et al. | |
| 2017/0322075 A1 | 11/2017 | Rigoni et al. | |
| 2018/0045826 A1* | 2/2018 | Kasaba | B60Q 1/302 |

FOREIGN PATENT DOCUMENTS

| | | |
|---|---|---|
| DE | 1031512 B | 6/1958 |
| DE | 2500092 A1 | 7/1976 |
| DE | 2804283 A1 | 8/1978 |
| DE | 4240313 A1 | 6/1994 |
| DE | 19943642 A1 | 3/2001 |
| DE | 10057165 A1 | 5/2002 |
| DE | 69717959 T2 | 9/2003 |
| DE | 102006045549 A1 | 4/2008 |
| EP | 0500496 A1 | 8/1992 |
| EP | 0517044 A2 | 12/1992 |
| EP | 0570165 A2 | 11/1993 |
| EP | 0839623 A1 | 5/1998 |
| EP | 1087001 A2 | 3/2001 |
| EP | 1308084 A1 | 5/2003 |
| EP | 1506249 A1 | 2/2005 |
| EP | 1582549 A1 | 10/2005 |
| EP | 1772667 A2 | 4/2007 |
| EP | 3099731 A1 | 12/2016 |
| GB | 1476108 A | 6/1977 |
| JP | 2003-004942 A | 1/2003 |
| JP | 2008009238 A * | 1/2008 |
| WO | 96/15102 A2 | 5/1996 |
| WO | 02/26862 A1 | 4/2002 |
| WO | 03/95521 A1 | 11/2003 |
| WO | 2005/113639 A1 | 12/2005 |
| WO | 2006/108520 A1 | 10/2006 |
| WO | 2007/135032 A2 | 11/2007 |
| WO | 2008/012775 A1 | 1/2008 |
| WO | 2008/037364 A1 | 4/2008 |
| WO | 2008/071363 A2 | 6/2008 |
| WO | 2008/149093 A1 | 12/2008 |
| WO | 2014/095981 A1 | 6/2014 |
| WO | 2014/100300 A1 | 6/2014 |
| WO | 2015/113916 A1 | 8/2015 |
| WO | 2016/037865 A1 | 3/2016 |

OTHER PUBLICATIONS

International Preliminary Report on Patentability received for PCT Patent Application No. PCT/EP2018/084855, dated Jul. 2, 2020, 16 pages (9 pages of English Translation and 7 pages of Original Document).

International Search Report and Written Opinion received for PCT Patent Application No. PCT/EP2018/084855, dated Mar. 26, 2019, 19 pages (8 pages of English Translation and 11 pages of Original Document).

* cited by examiner

DEVICE COMPRISING A MULTI-LAYER BODY AND A LIDAR SENSOR

CROSS-REFERENCE TO RELATED APPLICATIONS

This application is a national stage application (under 35 U.S.C. § 371) of PCT/EP2018/084855, filed Dec. 14, 2018, which claims benefit of European Application No. 17209207.4, filed Dec. 21, 2017, both of which are incorporated herein by reference in their entirety.

The invention relates to a sensor system comprising a LiDAR sensor which emits laser light having a wavelength in the range from 800 nm to 1600 nm, and to a cover surrounding all or part of the LiDAR sensor and comprising a multilayer article. The multilayer article, which is disposed in front of the LiDAR sensor, comprises a substrate layer made from a thermoplastic composition, and at least one topcoat layer. The invention further relates to vehicles comprising such sensor systems, and to the use of certain topcoats as a coating layer for multilayer LiDAR sensor covers.

Driver assistance systems such as emergency brake assistants, lane departure warning systems, traffic sign recognition systems, adaptive speed control systems and distance controllers are known and are employed in current vehicles. To implement the recited functions, surroundings detection sensors generally based on radar, LiDAR, ultrasound and camera sensors are employed. LiDAR sensors are important in particular for highly automated and autonomous driving, since they are capable of providing high-resolution three-dimensional images of the vehicle surroundings at from close to distant range. The substrate materials described in the present invention are suitable in particular for LiDAR sensors.

LiDAR (short for light detection and ranging) or else LaDAR (laser detection and ranging) is a method for optical distance and velocity measurement that is related to radar. Instead of radio waves or microwaves in the case of radar, it uses infrared laser beams. There are very different types of LiDAR systems, which differ inter alia in the horizontal detection range (e.g. 70° up to) 360°, the type of laser (e.g. continuous-wave scanner laser or static pulsed laser) and the sensor technology (e.g. mechanically rotating mirror or semiconductor electronics). The present invention also covers infrared cameras related technically to LiDAR that use their own infrared light source.

Component parts based on thermoplastic material offer many advantages over conventional materials such as for example glass for use in the automotive sector. These include for example elevated fracture resistance and/or weight reduction which in the case of automobiles allow greater occupant safety in road traffic accidents and lower fuel consumption. Finally materials containing thermoplastic polymers allow substantially greater design freedom on account of their easier mouldability.

Since thermoplastic materials are generally permeable to infared (IR) radiation these should in principle be suitable for such sensor systems. Surprisingly, as has been recognized in the context of the invention, however, most conventional thermoplastics employed in automotive exteriors are not suitable for such sensors. It was thus shown that even low wall thicknesses of less than 1 mm are sufficient for many thermoplastics to markedly reduce the signal strength of a LiDAR sensor such that they are unsuitable for such systems. These include for example polyolefins, polyamides, ABS, PC/ABS blends and further thermoplastic materials commonly employed in automotive exteriors.

Besides the substrate material itself, there are also other factors that contribute to attenuating the LiDAR sensor signal. Examples thereof include further components made from different materials, and also protective layers and/or coating layers. The purpose of a cover made from a thermoplastic material is to conceal the LiDAR sensor and also to protect the sensitive sensor electronics. The cover itself, however, must be protected from weathering and environmental effects and also from wear to the outer surface. Examples of this might include corresponding coating layers. Such protective layers are known in principle and are employed, for example, in the case of headlamp covers. It has emerged, however, that not just any coating and protective layers that are suitable for thermoplastic systems are suitable for coating a cover for a sensor system comprising a LiDAR sensor.

The functional capacity of the sensor system must be ensured; effects of weathering and service must not adversely affect the functional capacity of the sensor. Thus, however, abrasion, scratches or even erosion in the coating layer may result in attenuation of the signal from the LiDAR sensor. There is no teaching in the prior art about action on the influencing of LiDAR sensors as a result of customary service wear or weathered coating layers disposed on thermoplastic materials.

The prior art describes various thermoplastic systems which in principle exhibit a permeability to electromagnetic waves.

CN 105400189 A describes a laser beam-permeable opaque substrate material based on a polyurethane-polyester system. Special colorant combinations are recited which are suitable for these polyurethane-polyester-based systems and in principle are permeable to laser beams. Such compositions are suitable in particular for laser welding. Substrate materials based on polycarbonate are not described. Sensor-suitable substrate materials are likewise not described.

WO 2016/037865 A1 describes automotive exterior parts having a glasslike appearance. Substrate materials suitable for LiDAR systems are not described here.

WO 2008/12775 A1 describes radar sensors for automotive applications. However, these sensors operate in the range from 20-25 GHz and do not allow conclusions to be drawn about suitable substrate materials for laser-assisted systems in the IR region.

WO 2008/149093 A1 describes laminated and pigmented glass systems suitable inter alia for LiDAR sensors. A solution for polycarbonate-based substrate materials cannot be derived from this document.

US 2009/284603 A1 describes thermoplastic substrates which comprise colorants. These substrate materials are said to be highly permeable to IR radiation. Particular colorant mixtures are described. Whether these mixtures are suitable for laser-assisted detectors is not described. No specific colorant compositions for polycarbonate are described.

EP 1772667 A2 describes plastics component parts comprising concealed light elements. The plastics component part here conceals the light element but is transparent or semitransparent to the relevant radiation. To achieve this the substrate contains effect pigments. Such pigments are unsuitable for laser-assisted systems since they result in scattering.

JP 2003-004942 A describes multilayer articles consisting of various plies of materials having a differing refractive index. These systems are permeable to IR radiation. However, markedly higher demands are placed on materials for covers for laser-assisted IR sensors. No laser-assisted sensors are described.

US 2016/0291134 A1 reports on the use of LiDAR sensors in the automotive sector for autonomous/semiautonomous driving. This document does not elaborate on suitable substrate materials for covering or housing LiDAR sensors.

The scratch resistance of polycarbonate is also still capable of improvement; customarily, therefore, scratch-resistance coatings are also used for the coating of mouldings.

For these reasons, thermoplastic substrates such as shaped polycarbonate articles, for example, are provided with a protective coating. For exterior use, those protection systems that are particularly suitable are the ones which not only form mechanical protection against abrasion and scratching but also form excellent protection against effects of weathering, i.e. rainfall, temperature, and—in particular—ultraviolet radiation (UV).

The coating systems suitable for these purposes, which are used, for example, for polycarbonate headlamp covers, can be divided roughly into two categories:

(a) Thermosetting coating systems based on a polysiloxane coating material, which may be either single-layer or multi-layer systems (with a merely adhesion-promoting primer layer between substrate and polysiloxane topcoat). They are described in documents including U.S. Pat. Nos. 4,278,804 A, 4,373,061 A, 4,410,594 A, 5,041,313 A and EPA 1 087 001.

(b) Similarly, UV-curing coating systems, based for example on acrylate, urethane acrylate or acrylosilane, optionally including fillers to improve the scratch resistance, may form sufficient protection from weathering, owing to their relatively wide window of applied film thickness. Such systems are known and are described in documents including U.S. Pat. No. 3,707,397 A or DE 69 71 7959 T2, U.S. Pat. Nos. 5,990,188 A, 5,817,715 A, 5,712,325 A, and WO 2014/100300 A1.

The prior art describes systems permeable to IR radiation and based on thermoplastic substrates. Such substrates are suitable for example for infrared cameras or for laser welding. However, no teaching for action arises therefrom since laser-assisted sensor systems operating in the IR range have a markedly elevated sensitivity. Thus the slightest scattering results in errors in the sensor system and thus makes corresponding substrate materials unusable.

Multilayer articles having a substrate layer of thermoplastic material, more particularly those based on aromatic polycarbonate, which can be used for automotive, rail vehicle and aircraft exterior parts, etc., and which are suitable for surroundings monitoring for vehicles via LiDAR sensors, are therefore not described.

Exterior parts comprising, preferably consisting of, a multilayer article comprising a substrate layer made from thermoplastic material, which are used in the automotive, rail vehicle and aircraft sectors and/or in the infrastructure sector, ought also ideally to have a long lifetime and not undergo embrittlement during their lifetime—that is, they should have the greatest possible weathering stability. The colour and surface (gloss effect) too should as far as possible undergo only slight changes. The thermoplastic parts should also ideally exhibit sufficient scratch resistance. A lack of scratch resistance and/or weathering stability may adversely affect not only the lifetime of the component itself but also the functioning of the sensor system.

It is accordingly an object of the present invention to provide corresponding apparatus, i.e. systems, which feature a combination for surroundings monitoring, comprising a cover composed of a suitable multilayer article, comprising a substrate layer made of a thermoplastic material and a topcoat layer, and a LiDAR sensor that operates in the IR range from 800 nm to 1600 nm. It is further intended that ideally at least one of the further abovementioned requirements be fulfilled/corresponding disadvantages be overcome.

It was an object of the present invention to provide an apparatus for a means of transport such as a rail vehicle, aircraft—for instance aeroplane, helicopter or drone—or motor vehicle, comprising a combination of a LiDAR sensor that operates in a wavelength range from 800 to 1600 nm and a weathering- and abrasion-resistant cover that is suitable, i.e. which has the effect of minimizing signal attenuation, and which is composed of a multilayer article having a substrate layer made of a thermoplastic composition.

Surprisingly it has been found that the object is achieved by a sensor system comprising a) a LiDAR sensor which emits laser light having a wavelength in the range from 800 to 1600 nm and
b) a cover surrounding all or part of the LiDAR sensor and comprising a multilayer article comprising, in this order,
   i) a substrate layer comprising a thermoplastic composition based on aromatic polycarbonate having a melt volume rate MVR of 8 to 20 $cm^3/(10\ min)$, preferably 9 to 19 $cm^3/(10\ min)$, determined according to ISO 1133-1:2012-03 (300° C., 1.2 kg),
      wherein the composition has a light transmission in the range from 380 to 780 nm of less than 25.0%, preferably up to 20%, more preferably less than 15.0%, determined at a layer thickness of 4 mm according to DIN ISO 13468-2:2006 (D65, 10°), and wherein the substrate layer in its respective thickness has a transmission for IR radiation in the range from 800 to 1600 nm of at least 40%, preferably 45%, more preferably 55% and especially preferably greater than 65%, determined according to DIN ISO 13468-2:2006 (based on this standard, recited wavelength range used), and
   ii) optionally a primer layer based on polymethyl methacrylate (PMMA) and comprising at least one UV absorber,
   iii) a polysiloxane-based topcoat layer comprising a combination of an organically modified silane with a silica sol, the topcoat layer comprising silicon dioxide particles having a $D_{90}$, determined by means of scanning transmission electron microscopy, of less than 0.50 μm and comprising no further particles having a $D_{90}$, determined by means of scanning transmission electron microscopy, ≥0.50 μm,
      wherein the topcoat layer is on the side of the substrate layer that is opposite the side of the substrate layer on which the LiDAR sensor is disposed, and where the topcoat layer preferably comprises a UV absorber, or by a vehicle, more particularly a motor vehicle, comprising such a system.

Covers of interest specifically are those made from dark, coloured polycarbonate, since they allow the LiDAR sensor to be concealed behind them, and since components can be produced by injection moulding, and since polycarbonate also has very good properties such as high heat distortion resistance, high stiffness, and other properties.

"System" is used here not only in the narrow sense of a package of mechanically joined individual parts, such as an apparatus, for instance, but also more broadly as a mere combination of individual parts (merely) joined in a functional sense to form a unit. The LiDAR sensor may be installed into the respective vehicle separately and the cover provided for a desired position in the vehicle through which the pulses of the LiDAR sensor are intended to pass. A mechanically joined combination may likewise be concerned.

"Based on" in relation to the substrate layer means here that the composition of the substrate layer comprises the aromatic polycarbonate as the principal component, preferably in a proportion of at least 70% by weight, preferably at least 80% by weight, more preferably at least 85% by weight, yet more preferably at least 90% by weight, very preferably at least 95% by weight of the respective polymer, based in each case on the overall composition of the substrate layer. For the primer layer, in relation to the polymethyl methacrylate which likewise forms the basis of the primer layer, it is the case that the proportion of the polymethyl methacrylate comprises preferably at least 50% by weight, more preferably at least 60% by weight, very preferably at least 65% by weight of polymethyl methacrylate.

The $D_{90}$ figure refers to the particle size for which 90% of the particles are smaller. Correspondingly, the $D_{50}$ figure is the mean particle size. 50% of the particles have a particle size smaller than the specified figure. For the purposes of the present invention, the method for determining the respectively reported particle sizes is as follows: Determination by means of TEM/STEM (scanning transmission electron microscope) in accordance with DIN SPEC 52407:2015 03, the sample being prepared in the form of a thin section on a coating layer. A greyscale image was obtained via the measurement, because the particles are more dense than the matrix. Via greyscale analysis, using methods of image analysis, the particles are separated from the matrix; the size can then be determined. Image analysis determines the diameter of the particles (preferably by analysing the particle area; the diameter is ascertained by means of the area-equivalent circle (ECD method; equivalent circle diameter). The statistical analysis, e.g. $d_{90}$; median, arithmetic mean, takes place on a random sample. For the purposes of the present invention, the figure reported is always the arithmetic mean of the diameter (D(n)).

"Transmission in the range from 800 nm to 1600 nm" denotes an average transmission (arithmetic mean) over this range, averaged over all the wavelengths in this range.

"Cover" or "use for covering" is to be understood as meaning according to the invention that the cover made of or comprising the subregion made of the described thermoplastic composition is used to be placed in front of the LiDAR sensor in order to cover it "with respect to the outside" or to protect it against impact, soiling, etc. The cover may also serve aerodynamic and/or design ends. A cover within the meaning of the invention may therefore be a housing which completely or substantially completely—apart from cable ducts etc.—encompasses the LiDAR sensor. Such a combination of housing and LiDAR sensor likewise forms part of the subject matter of the invention in addition to the superordinate system of the vehicle. It will be appreciated that all embodiments and configurations described as preferable also apply to this combination alone. Likewise the cover may however also be only one element placed in front of the LiDAR sensor in the direction of the vehicle outer skin, preferably as the vehicle outer skin. Such a cover is for example a front panel or a bumper, preferably a front panel. According to the invention a front panel is to be understood as meaning a vehicle body part which as part of the outer shell is attached to the vehicle. This may be a formative constituent of the vehicle front or a design element attached to the front of the vehicle. A "front panel" is further to be understood as meaning for example a replacement for a radiator grille. As a result of new mobility forms, for example electromobility, a radiator grille consisting of a multiplicity of openings is no longer necessary. A front panel is therefore preferably a self-contained front cover or a body part which may comprise only occasional ventilation slots or retains a radiator grille appearance only for design reasons and combines various functions. A component of this kind can be integrated seamlessly. The cover here is the element through which the laser light (pulse or continuous wave) of the LiDAR sensor is emitted for the purpose of detecting the surroundings. Covers according to the invention also include side panels, for example door elements, or rear panels, which allow covering of any required lateral sensors or sensors attached at the rear.

The cover "consists" preferably of the multilayer article. "Multilayer articles" in the sense of the present invention are articles which comprise at least the substrate layer and a topcoat layer. The topcoat layer here, which has the function of a scratch resistance layer and/or weathering protection layer, may itself be a single-layer or multilayer system. Between the topcoat layer and the substrate layer, moreover, there may also be a primer layer. Particularly preferred covers consist of the substrate layer and topcoat layer situated on one or both sides of the substrate layer—the topcoat layer may be the same or different—optionally in each case with a primer layer between substrate layer and topcoat layer.

The cover may be mounted not only on motor vehicles but also on other means of transport and means of locomotion, such as drones, aeroplanes, helicopters or rail vehicles, which in accordance with the invention are all subsumed within the term "vehicles".

"Substrate layer comprising a thermoplastic composition" is to be understood as meaning that the substantial part of the substrate layer, namely the part arranged in front of the LiDAR sensor, i.e. which covers the LiDAR sensor with respect to the vehicle surroundings, is made of such a thermoplastic composition, i.e. the substrate layer comprises a region which consists of such a thermoplastic composition, this region being arranged in front of the LiDAR sensor. However, the substrate layer may also comprise other subregions made of another thermoplastic composition which does not have the features according to the invention. In the case of a front panel, for example, this may relate to regions for headlamp covers that exhibit high light transmission. Such covers are producible in particular in two-component or multi-component injection moulding processes. Likewise the cover may comprise subregions made of different compositions having the features according to the invention. However, it is preferable according to the invention when the substrate layer consists of the thermoplastic composition.

Topcoat layers may be implemented on one or both sides of the substrate layer. At least one topcoat layer is preferably applied on the side of the cover designed to be on the outside of the vehicle, more particularly of the motor vehicle, i.e. on the side oriented towards the environment. If topcoat layers are applied on both sides, it is also possible for different coatings to be used. For the outward-facing side, particular preference is given to layers which improve the resistance to media, the weathering stability and/or the abrasion resistance. On the inwardly directed side of the multilayer article, coatings may be used in particular for improving the anti-dust, anti-fog and/or antireflection properties.

"Up to" is to be understood as including the recited value. "Up to 20%" thus also embraces "20%" and likewise values lying in the rounding range, for example "20.3%".

That the "substrate layer in its respective thickness has a certain transmission for IR radiation" here means that the IR permeability is to be determined on the respective moulding in the region of the LiDAR beam path. The actual permeability of the component part to IR radiation in the range from 800 to 1600 nm is considered here. Similar comments apply in respect of the reported light transmission in the VIS region.

"Multilayer" in the sense of the invention denotes "at least two layers", namely a substrate layer and a topcoat layer lying on the side of the substrate layer that faces the LiDAR sensor; additionally to the topcoat layer there may also be a primer layer, lying between topcoat layer and substrate. In particular, however, there may also be further protective layers or functional layers on the inwardly directed side of the multilayer article, more particularly a second topcoat layer and optionally primer layer, and also functional layers such as, for example, anti-reflection, anti-fog and/or anti-dust layers, provided that these layers do not significantly attenuate the signal from the LiDAR sensor.

According to the invention "vehicle" is to be understood as meaning all means of transport, of goods and/or persons, i.e. landcraft, watercraft and aircraft.

The thickness of the substrate layer is the thickness of the thickest point of the substrate layer in the region of the LiDAR beam passage.

The multilayer articles described are sufficiently permeable to the laser light of the LiDAR sensor.

The multilayer article comprising at least one topcoat layer is preferably such that the topcoat layer and optionally other layers present, such as primer layers, for example, do not significantly reduce the transmission of the cover for the radiation from the LiDAR sensor. "Not significantly" denotes a reduction in intensity of the laser IR radiation in the range from 800 to 1600 nm, more particularly from 880 nm to 950 nm and/or from 1520 to 1570 nm, that has passed through the cover of up to 15%, preferably up to 10%, more preferably up to 5%, compared to the same cover without a topcoat layer. If, besides the at least one topcoat layer, additionally to the substrate layer, there are further layers present, these layers all together, preferably together with the topcoat layer, also lead preferably to a reduction in intensity of the laser IR radiation in the range from 800 to 1600 nm, more particularly from 880 nm to 950 nm and/or 1520 to 1570 nm, determined according to DIN ISO 13468-2:2006, of at most up to 15%, preferably up to 10%, more preferably up to 5%, compared to the same cover composed solely of a substrate layer, in other words a cover comprising no layers other than the substrate layer.

Between the LiDAR sensor and the cover, as well, there is preferably nothing to attenuate significantly the signal of the LiDAR sensor. Not "significantly" here means a maximum additional attenuation of up to 5%.

In respect of further preferred embodiments the features described elsewhere apply.

A further subject of the invention is the use of a multilayer article comprising i) a substrate layer, preferably having a thickness of 1.0 to 7.0 mm, more preferably 1.0 to 6.0 mm, comprising, preferably consisting of, a thermoplastic composition based on aromatic polycarbonate having a melt volume rate MVR of 8 to 20 $cm^3/(10\ min)$, preferably 9 to 19 $cm^3/(10\ min)$, determined according to ISO 1133-1:2012-03 (300° C., 1.2 kg), wherein the composition has a light transmission in the range from 380 to 780 nm of less than 25.0%, preferably up to 20%, more preferably less than 15%, determined at a layer thickness of 4 mm according to DIN ISO 13468-2: 2006 (D65, 10°) and where the substrate layer in its respective thickness has a transmission for IR radiation in the range from 800 to 1600 nm, more particularly from 880 nm to 950 nm and/or from 1520 to 1570 nm, of at least 40%, preferably at least 65%, and ii) optionally a primer layer based on polymethyl methacrylate and comprising at least one UV absorber, and iii) at least one polysiloxane-based topcoat layer, comprising a combination of an organically modified silane with a silica sol, where the topcoat layer comprises silicon dioxide particles having a $D_{90}$, determined by means of scanning transmission electron microscopy, of less than 0.50 μm and comprising no further particles having a $D_{90}$, determined by means of scanning transmission electron microscopy, ≥0.50 μm, for the partial or complete covering of a LiDAR sensor which emits laser light having a wavelength in the range from 800 to 1600 nm, more particularly from 880 nm to 950 nm and/or from 1520 to 1570 nm, where the topcoat layer is on the side of the substrate layer that is opposite the side of the substrate layer on which the LiDAR sensor is disposed.

It will be appreciated that the feature variants described as preferable for the sensor system likewise apply to the recited use and, respectively, to the vehicle.

It is preferable when the covers, in particular the substrate layer, give a black colour impression. Coloured covers are in principle also realizable, i.e. for instance red, green or blue covers.

The covers made of or comprising regions made of the described thermoplastic compositions also exhibit the following positive properties in these regions:

a glasslike appearance;

a low weight compared to steel or glass which is important in order to be able to keep the weight of the vehicle as low as possible;

they meet the requirements in respect of the safety of the vehicle occupants as well as that of other road users, in particular pedestrians, and show in particular sufficient elasticity and deformability but also a low propensity for splintering;

they make it possible to integrate electrical, electronic, optoelectronic and optical functional elements without noticeably impairing their function both in relation to the vehicle and its occupants and in relation to the external environment;

they make it possible to cover electrical, electronic, optoelectronic and optical functional elements without noticeably impairing their function both in relation to the vehicle and its occupants and in relation to the external environment;

they can have an attractive design, in particular have an uninterrupted and seamless design while ideally having been formed in two, preferably in all three, dimensions;

they may be produced in simple fashion, in particular with the fewest possible manufacturing steps, wherein in particular all manufacturing steps are realizable with integration of at least some of the functional elements in one mould and subsequent attachment and sealing of the functional elements may be omitted;

they may be subjected to overmoulding in regions in front of the LiDAR sensor with the described thermoplastic compositions and in regions not in front of the LiDAR sensor also with other thermoplastic compositions;

they may have, at least on outward facing parts of the vehicle, an attractive surface which is resistant to environmental influences, for example weathering, but also stone impacts.

Such a cover is moreover very easily producible wherein all manufacturing steps are realizable with integration of the functional elements in one mould and subsequent attachment and sealing of the functional elements may be omitted.

The covering of further functional elements and devices in addition to the LiDAR sensor may be effected, for example of distance sensors as a parking aid for example, motion sensors by means of which for example the bonnet may be opened, lighting strips, headlights, indicators, cameras and displays. As described above, the cover and also the substrate layer may also comprise transparent regions to this end. Furthermore this solution is in principle also suitable for radar-assisted sensors.

The cover is preferably a moulding employed in the front or rear region of a vehicle, for example a bumper, radiator grille, front panel or a rear panel, in particular a front panel for a motor vehicle, but may likewise be a vehicle side element. However the cover may likewise also be a roof or roof module for a motor vehicle. It is particularly preferable when no further elements are present between the cover and the LiDAR sensor along the path of the beam trajectory which could impair the work of the LiDAR sensor.

The LiDAR sensor employed according to the invention emits laser light in the range from 800 to 1600 nm, preferably in the range from 820 to 1600 nm, more preferably in the 880 nm to 950 nm and/or 1520 to 1570 nm range. Especially preferred LiDAR sensors operate at a nominal wavelength (measured in air) of around 905 nm, or at a nominal wavelength of around 1550 nm (measured in air).

The distance from the LiDAR sensor to the cover is preferably ≤300 mm, more preferably ≤200 mm, more preferably still ≤100 mm, very preferably ≤50 mm. The chosen distance is essentially construction-related, since it should be chosen such that the sensor is sufficiently protected from impact events. In principle, the LiDAR sensor may also be placed directly onto the cover and optionally connected to the cover, by adhesive bonding or by screwing, for example.

The positioning of the LiDAR sensor is preferably selected such that the sensor is disposed centrally in the front region or in the rear region of the vehicle. The LiDAR sensor may alternatively be disposed or offset in corner regions of the vehicle, for example.

The substrate layer of the covers described according to the invention in the region of the described thermoplastic compositions, preferably in the entire region of the substrate layer, preferably has a thickness of 1.0 to 7.0 mm, preferably 1.6 to 6.0 mm, particularly preferably a thickness of 2.0 to 4.0 mm. Given that the topcoat layer present in accordance with the invention has a thickness in the nm range, and the same is true of the primer layer when present, the overall thickness of the cover does not deviate substantially from these figures, and so the figures may be understood equally well for the total thickness of the cover.

Aromatic polycarbonates selected in accordance with the invention preferably have weight-average molecular weights $M_w$ of 22 000 to 29 000 g/mol, although in principle weight-average molecular weights $M_w$ of 10 000 to 50 000 g/mol, more preferably of 14 000 to 40 000 g/mol, very preferably of 16 000 to 32 000 g/mol would also be suitable. The values for $M_w$ here are determined by a gel permeation chromatography, calibrated against bisphenol A polycarbonate standards using dichloromethane as eluent, calibration with linear polycarbonates (made of bisphenol A and phosgene) of known molar mass distribution from PSS Polymer Standards Service GmbH, Germany; calibration according to method 2301-0257502-09D (2009 Edition in Germany) from Currenta GmbH & Co. OHG, Leverkusen. The eluent is dichloromethane. Column combination of crosslinked styrene-divinylbenzene resins. Diameter of analytical columns: 7.5 mm; length: 300 mm. Particle sizes of column material: 3 μm to 20 μm. Concentration of solutions: 0.2% by weight. Flow rate: 1.0 ml/min, temperature of solutions: 30° C. Detection using a refractive index (RI) detector.

The polycarbonates are preferably produced by the interfacial process or the melt transesterification process, which have been described many times in the literature.

With regard to the interfacial process reference is made for example to H. Schnell, "Chemistry and Physics of Polycarbonates", Polymer Reviews, Vol. 9, Interscience Publishers, New York 1964 p. 33 et seq., to Polymer Reviews, Vol. 10, "Condensation Polymers by Interfacial and Solution Methods", Paul W. Morgan, Interscience Publishers, New York 1965, Chapt. VIII, p. 325, to Dres. U. Grigo, K. Kircher and P. R-Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pp. 118-145 and also to EP 0 517 044 A1.

The melt transesterification process is described, for example, in the "Encyclopaedia of Polymer Science", Vol. 10 (1969), Chemistry and Physics of Polycarbonates, Polymer Reviews, H. Schnell, Vol. 9, John Wiley and Sons, Inc. (1964), and in patent specifications DE 10 31 512 A and U.S. Pat. No. 6,228,973 B1.

The polycarbonates are preferably prepared by reactions of bisphenol compounds with carbonic acid compounds, especially phosgene, or of diphenyl carbonate or dimethyl carbonate in the melt transesterification process.

Particular preference is given here to homopolycarbonates based on bisphenol A and copolycarbonates based on the monomers bisphenol A and 1,1-bis(4-hydroxyphenyl)-3,3,5-trimethylcyclohexane, for example Apec® from Covestro Deutschland AG.

These and further bisphenol/diol compounds employable for polycarbonate synthesis are described inter alia in WO 2008/037364 A1 (page 7, line 21 to page 10, line 5), EP 1 582 549 A1 ([0018] to [0034]), WO 2002/026862 A1 (page 2, line 20 to page 5, line 14) and WO 2005/113639 A1 (page 2, line 1 to page 7, line 20).

The polycarbonates may be linear or branched. It is also possible to use mixtures of branched and unbranched polycarbonates.

Suitable branching agents for the production of branched polycarbonates are known from the literature and described for example in the patent documents U.S. Pat. No. 4,185,009 B and DE 25 00 092 A1 (3,3-bis(4-hydroxyaryloxindoles), see whole document in each case), DE 42 40 313 A1 (see page 3, lines 33 to 55), DE 19 943 642 A1 (see page 5, lines 25 to 34) and U.S. Pat. No. 5,367,044 B and in literature cited therein.

Furthermore, the polycarbonates used may also be intrinsically branched, in which case no branching agent is added in the course of polycarbonate preparation. An example of intrinsic branching is that of so-called Fries structures, as described for melt polycarbonates in EP 1 506 249 A1.

In addition, it is possible to use chain terminators in the polycarbonate preparation. The chain terminators used are preferably phenols such as phenol, alkylphenols such as cresol and 4-tert-butylphenol, chlorophenol, bromophenol, cumylphenol or mixtures thereof.

In principle the substrate layer composition described may comprise further polymers as well as the aromatic polycarbonate, including mixtures; in other words, it may comprise thermoplastic polymers other than aromatic polycarbonate. Such thermoplastic polymers are polystyrene, styrene copolymers, cyclic polyolefin, poly- or copolyacrylates and poly- or copolymethacrylate such as, for example, poly- or copolymethyl methacrylates (such as PMMA), and also copolymers comprising styrene, for example transparent polystyrene acrylonitrile (PSAN), thermoplastic polyurethanes, polymers based on cyclic olefins (for example TOPAS®, a commercial product from Ticona), polycarbonate blends comprising olefinic copolymers or graft polymers, for example styrene/acrylonitrile copolymers.

Further thermoplastic polymer may be present only in amounts such that the transmission for the laser light of the LiDAR sensor is not disrupted to an extent such that the system loses its functional capacity. The substrate layer therefore preferably contains less than 5.0% by weight, more preferably less than 1.0% by weight, of further thermoplastic polymer, and very preferably no further thermoplastic polymer at all. According to the invention "less than" is to be understood as meaning that the respective component may also not be present at all.

According to the invention preference is given to a sensor system comprising
  a) a LiDAR sensor which emits laser light having a wavelength in the range from 800 to 1600 nm and
  b) a cover surrounding all or part of the LiDAR sensor and comprising a multilayer article comprising, in this order,
    a substrate layer comprising a thermoplastic composition,
      wherein the composition has a light transmission in the range from 380 to 780 nm of less than 25.0%, preferably up to 20%, more preferably less than 15%, determined at a layer thickness of 4 mm according to DIN ISO 13468-2: 2006 (D65, 10°), and where the substrate layer in its respective thickness has a transmission for IR radiation in the range from 880 nm to 950 nm and/or 1520 to 1570 nm of at least 65%, determined according to DIN ISO 13468-2: 2006,
      and wherein the thermoplastic composition comprises
    i) at least 70% by weight of aromatic polycarbonate having a melt volume rate MVR of 8 to 20 cm³/(10 min), determined according to ISO 1133-1:2012-03 (300° C., 1.2 kg),
    ii) at least one green and/or blue colorant and
    iii) at least one red and/or violet colorant,
    iv) optionally further colorants,
    and 0% to less than 5.0% by weight of further thermoplastic polymers
    and 0% to less than 0.005% of carbon black,
    where the sum of the colorants ii) to iv) in the thermoplastic composition is >0.005% by weight, preferably >0.05% by weight and where the thickness of the substrate layer is 1.0 to 7.0 mm, preferably 1.5 to 6.0 mm, more preferably 2 to 5 mm, very preferably 2.0 to 5.0 mm,
    and
    at least one polysiloxane-based topcoat layer comprising a combination of an organically modified silane with a silica sol, the topcoat layer comprising silicon dioxide particles having a $D_{90}$, determined by means of scanning transmission electron microscopy, of less than 0.50 μm, preferably less than 0.20 μm, more preferably less than 100 nm, very preferably less than 50 nm, especially preferably less than 30 nm, most preferably 15 to 30 nm, and comprising no further particles having a $D_{90}$, determined by means of scanning transmission electron microscopy, ≥0.50 μm.

The composition comprises a green and/or a blue colorant (component ii) and also a red and/or violet colorant (component iii). Further colorants (component iv) may optionally be employed—especially preferably yellow colorants.

Preference is therefore given to using at least one colorant selected from the colorants of formulae (1), (2a-c), (3), (4), (5), (6), (7), (8) (group ii), especially preferably (1), (2a-c), (3) or (4), with at least one colorant selected from the colorants of the formulae (9), (10), (11), (12), (13) (14a), (14b), (15) (group iii), preferably selected from the formulae (10), (14a), (14b) or (15). Optional further colorants (group iv) are preferably selected from the colorants of formulae (16) to (20), especially preferably selected from the colorants of formulae (16) and (17). The colorants to which these formulae relate are described in more detail below.

Green colorants are especially preferably colorants of formulae (1) and (2a/2b/2c):

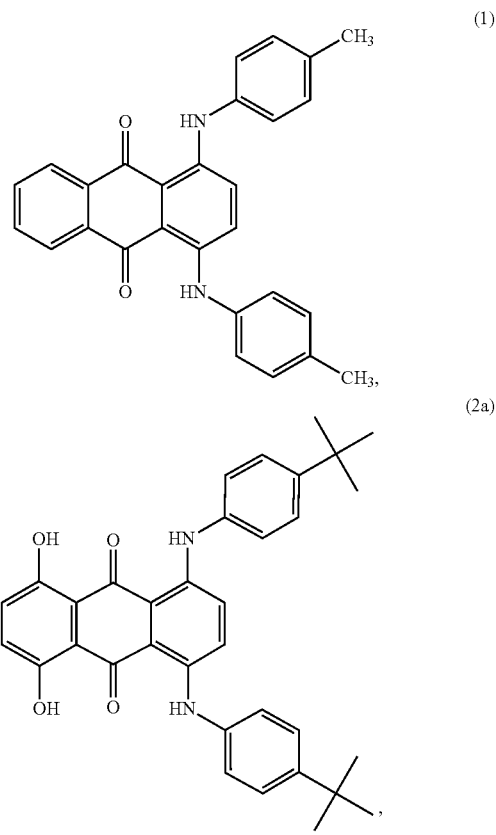

-continued (2b)

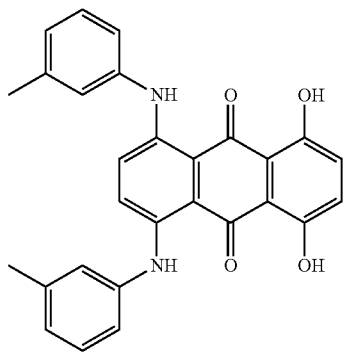

(2c)

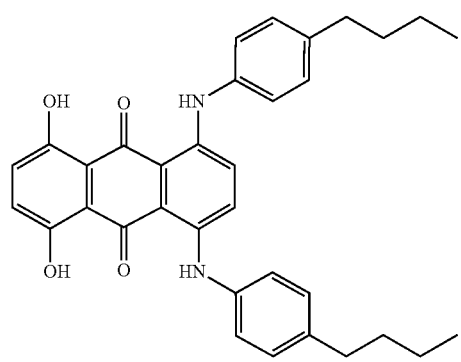

The colorant of formula (1) is known under the name Macrolex Green 5B from Lanxess Deutschland GmbH, Colour Index number 61565, CAS Number: 128-90-3, and is an anthraquinone dye.

Colorants of formulae (2a), (2b) and (2c) are known inter alia under the name Macrolex Green G (Solvent Green 28).

Blue colorants employed are preferably colorants of formulae (3) and/or (4a/4b) and/or (5a/5b):

(3)

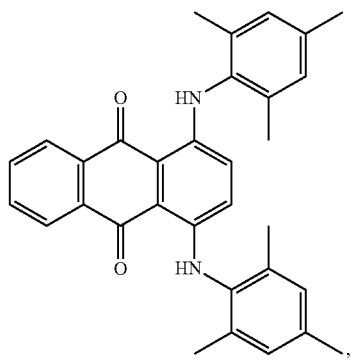

obtainable under the name "Keyplast Blue KR", CAS number 116 75-6,

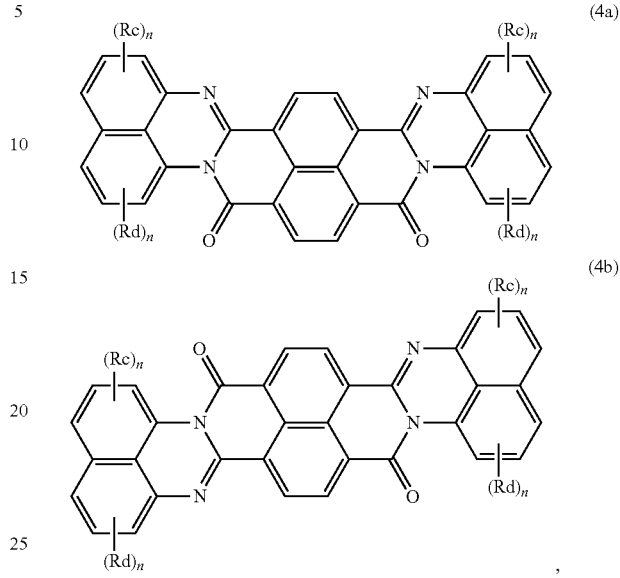

wherein
Rc and Rd independently of one another are a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl,
n independently of the respective R represents a natural number between 0 and 3, and for n=0 the radical is hydrogen.

In a preferred embodiment Rc and/or Rd are Cl and are in o- and/or p-positions relative to the carbon atoms bearing the amine functionalities, for example di-orthochloronaphthalino, di-ortho, mono-para-chloronaphthalino and mono-ortho-naphthalino. Furthermore in a preferred embodiment Rc and Rd each represent a tert-butyl radical which is preferably in the meta-position relative to the carbon atoms bearing the nitrogen functionalities.

In a particularly preferred embodiment n=0 in all rings, so that all Rc and Rd=H.

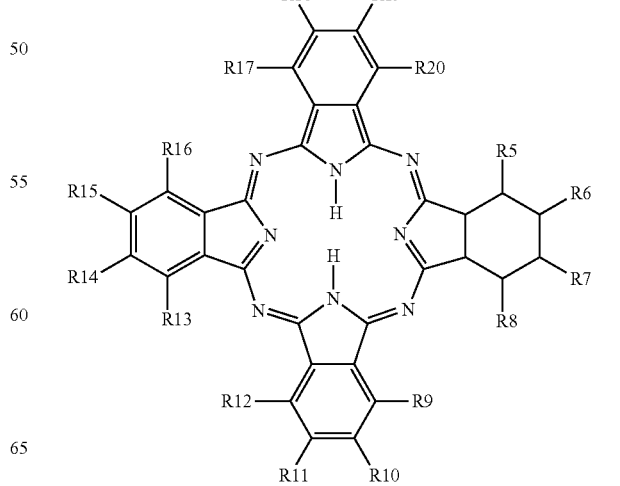

-continued

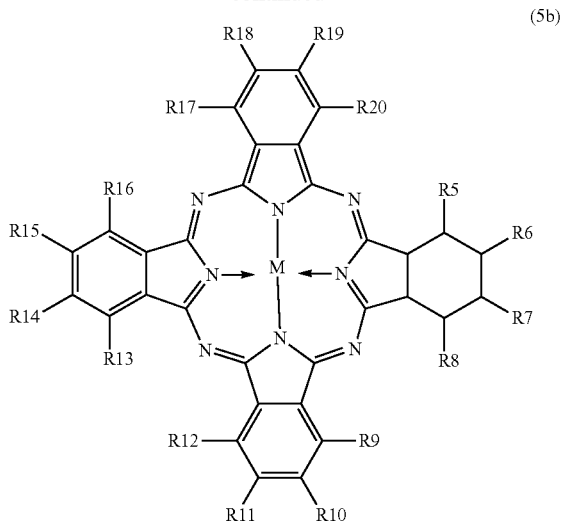
(5b)

The radicals R(5-20) are in each case independently of one another hydrogen, methyl, ethyl, propyl, isopropyl, butyl, isobutyl, tert-butyl, pentyl, neopentyl, hexyl, thexyl, fluoro, chloro, bromo, sulfone, CN.

Preferably, R(5-20) is the same in all positions. More preferably R(5-20) is H in all positions. In an alternative embodiment R(5-20) is Cl in all positions.

M is preferably aluminium (with R=H: Aluminium phthalocyanine, CAS: 14154-42-8), nickel (with R=H: Nickel phthalocyanine, CAS: 14055-02-8), cobalt (with R=H: Cobalt phthalocyanine, CAS: 3317-67-7), iron (with R=H: Iron phthalocyanine, CAS: 132-16-1), zinc (with R=H: Zinc phthalocyanine, CAS: 14320-04-08), copper (with R=H: Copper phthalocyanine, CAS: 147-14-8; with R=H and Cl: Polychlorocopper phthalocyanine, CAS: 1328-53-6; with R=Cl: Hexadecachlorophthalocyanine, CAS: 28888-81-5; with R=Br: Hexadecabromophthalocyanine, CAS: 28746-04-5), manganese (with R=H: Manganese phthalocyanine, CAS: 14325-24-7).

The combination of M=Cu and R=H for all positions is especially preferred. For instance, a compound of the structure (5b) with M=Cu and R(5-20)=H is obtainable as Heliogen® Blue K 6911D or Heliogen® Blue K 7104 KW from BASF AG, Ludwigshafen.

Compounds of the structure (5a) are available, for example, as Heliogen® Blue L 7460 from BASF AG, Ludwigshafen.

Also employable as blue colorants are:

Colorants of formula (6) obtainable under the name "Macrolex Blue 3R Gran"

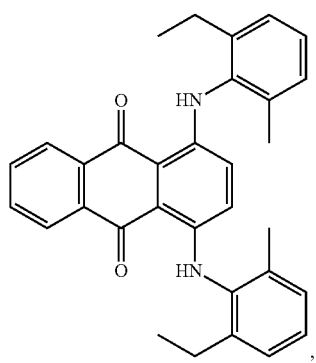
(6)

and/or colorants of formula (7) obtainable under the name "Macrolex Blue 3R Gran" (CAS 32724-62-2; Solvent Blue 97; C.I. 615290),

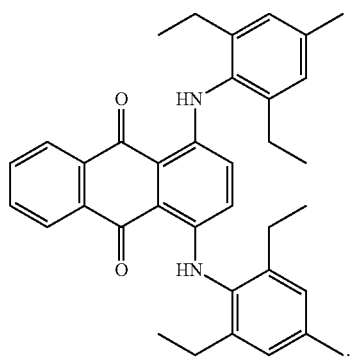
(7)

Also employable as blue colorants are:

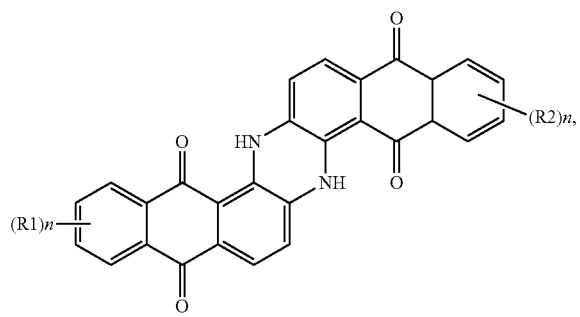
(8)

wherein

R1 and R2 are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl, n is a natural number between 0 and 4.

In a particularly preferred embodiment, n=0 in all rings, and so all R1 and R2=H.

Colorants of this structure (8) are commercially available under the Paliogen Blue series from BASF AG.

In the case of use of colorants of the structure (8), preference is given especially to the pigments having a bulk volume (determined according to DIN ISO 787-11:1995-10) of 2 l/kg-10 l/kg, preferably 3 l/kg-8 l/kg, a specific surface area (determined according to DIN 66132:1975-07) of 5 $m^2/g$-60 $m^2/g$, preferably 10 $m^2/g$-55 $m^2/g$, and a pH (determined according to DIN ISO 787-9) of 4-9.

Preferably employed as red colorant is a colorant of formula (9) obtainable under the name "Macrolex Red 5B" having CAS Number 81-39-0:

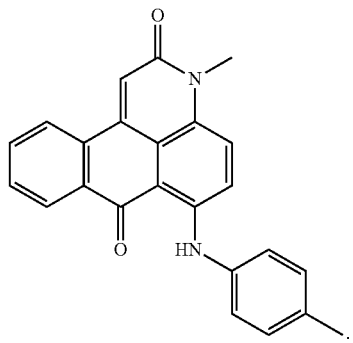

(9)

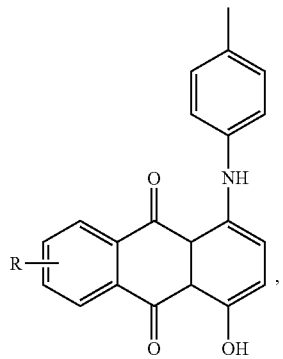

(13)

Also employable are colorants of formulae (10) having CAS Number 71902-17-5 and (11) having CAS Number 89106-94-5:

wherein R is selected from the group consisting of H and p-methylphenylamine radical; preferably R=H;

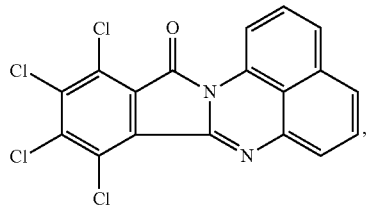

(10)

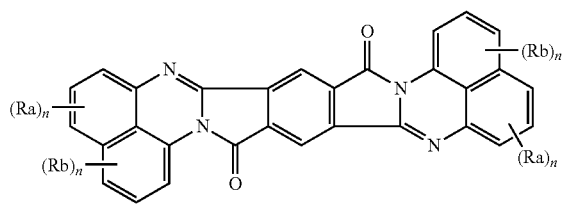

(14a)

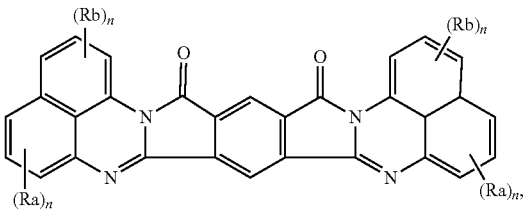

(14b)

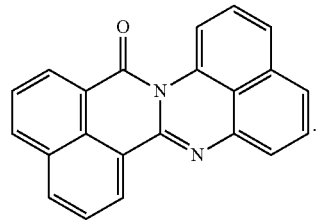

(11)

Preferably employed as violet colorants are colorants of formulae (12) having CAS Number 61951-89-1, (13) obtainable under the name "Macrolex Violet B" from Lanxess AG having CAS Number 81-48-1 or (14a/14b):

wherein

Ra and Rb are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl, n independently of the respective R represents a natural number between 0 and 3, wherein the radical for n=0 is hydrogen.

In a preferred embodiment Ra and/or Rb are Cl and are in o- and/or p-positions relative to the carbon atoms bearing the amine functionalities, for example di-orthochloronaphthalino, di-ortho, mono-para-chloronaphthalino and mono-ortho-naphthalino. Furthermore in a preferred embodiment Ra and Rb each represent a tert-butyl radical which is preferably in the meta-position relative to the carbon atoms bearing the nitrogen functionalities.

In a particularly preferred embodiment n=0 in all rings, so that all Ra and Rb=H.

Also employable are colorants conforming to formula (15) obtainable under the name "Macrolex RedViolet R", CAS Number 6408-72-6:

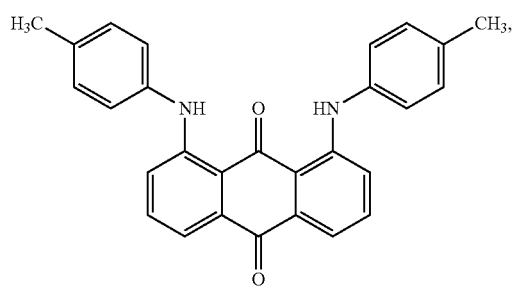

(12)

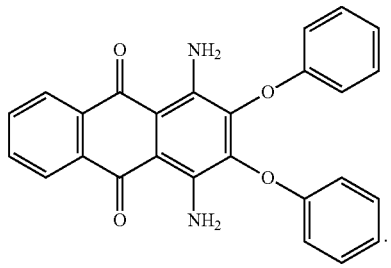

(15)

Preferably employed as yellow colorants are colorants of formulae (16) obtainable under the name "Macrolex Yellow 3G" having CAS Number 4702-90-3 and/or (17) obtainable under the name "Macrolex Orange 3G" (CAS Number 6925-69-5, C.I. 564100):

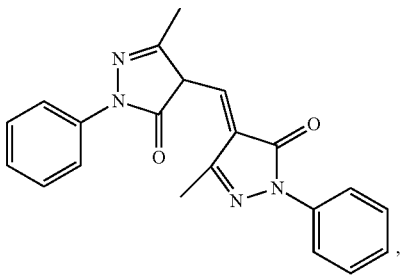

(16)

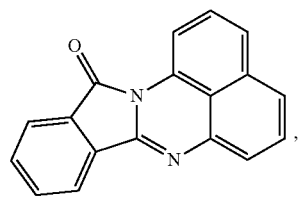

(17)

It is also possible to employ colorants of formulae (18) obtainable under the name "Oracet Yellow 180" having CAS Number 13676-91-0, (19) having CAS Number 30125-47-4 and/or (20) obtainable under the name "Oracet Orange 220; Solvent Orange 116" having CAS Number 669005-94-1.

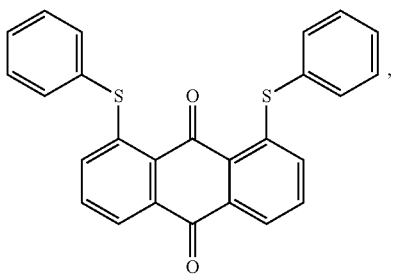

(18)

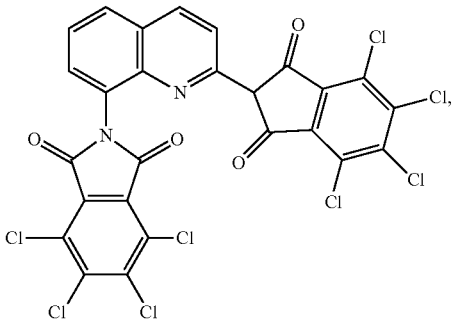

(19)

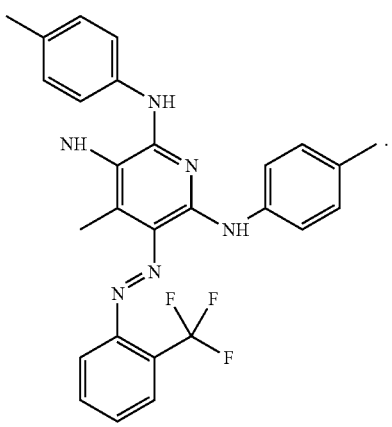

(20)

The group iv) of the further colorants preferably comprises less than 0.10% by weight of colorants which cannot be assigned to groups ii), iii) or to the colorants of structures (16) to (20). The group iv) of further colorants preferably consists only of colorants having the structures (16) to (20).

In principle, however, there may optionally be further colorants (component iv) used additionally, besides the colorants described above. Those preferred are Heliogen Green varieties (for example Heliogen Green K 8730; CAS 1328-53-6; Pigment Green 7; C.I. 74260).

With preference, however, the colorants of the composition with the substrate layer are selected exclusively from the colorants of formulae (1) to (20).

The composition comprises preferably less than 0.005% by weight, more preferably less than 0.001% by weight, of carbon black, and especially preferably it is free from carbon black.

The recited low transmission is obtained for example for compositions containing the colorant combination Macrolex Violet 3R from Lanxess AG (CAS 61951-89-1, Solvent Violet 36, Colour Index number 61102), an anthraquinone colorant:

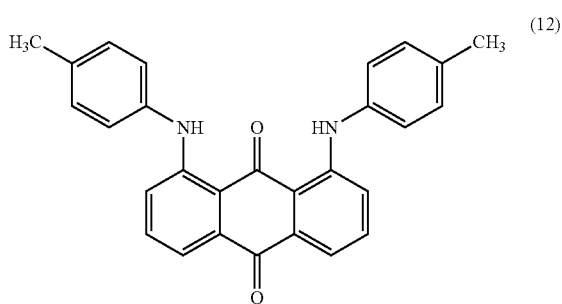

(12)

and Macrolex Green 5B from Lanxess AG (CAS 128-80-3, Solvent Green 3, Colour Index number 61565), likewise an anthraquinone colorant:

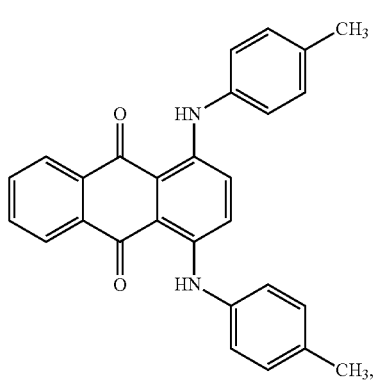

(1)

for example 0.1% by weight in each case of both of these colorants based on the overall composition.

The total concentration of colorants, particularly of those of the stated formulae, is preferably at least 0.13% by weight, more preferably 0.15% by weight, with particular preference at least 0.18% by weight.

The composition for the substrate layer material should ideally be processable at the temperatures customary for thermoplastics, i.e. at temperatures above 300° C., for example 350° C., without undergoing marked changes in optical properties, for example deep gloss, or mechanical properties during processing.

The compositions which form regions of the substrate layer(s) and are based on a thermoplastic polymer, preferably on aromatic polycarbonate, preferably contain in addition to the colorants one or more further customary additives. Such additives are described for example in EP-A 0 839 623, WO A 96/15102, EP-A 0 500 496 or "Plastics Additives Handbook", Hans Zweifel, 5th Edition 2000, Hanser Verlag, Munich, for example mould release agents, UV absorbers, heat stabilizers, flame retardants, antistats and/or flow improvers.

Here too, the compositions may in principle have added to them that which does not significantly impair the functionality of the sensor system.

The compositions particularly preferably contain less than 0.1% by weight of, and very particularly preferably the compositions of the substrate layer are free from, scattering additives, for example those based on acrylate, polyethylene, polypropylene, polystyrene, glass, aluminium oxide and/or silicon dioxide. Furthermore the composition particularly preferably contains less than 0.1% by weight of, and very particularly preferably is free from, white pigments or similar pigments such as, for example, titanium dioxide, kaolin, barium sulfate, zinc sulfide, aluminium oxide, aluminium hydroxide, quartz flour, from interference pigments and/or pearlescent pigments, i.e. platelet-shaped particles such as mica, graphite, talc, $SiO_2$, chalk and/or titanium dioxide, coated and/or uncoated. Furthermore the composition particularly preferably contains in total less than 0.1% by weight of, and very particularly preferably the composition is free from, nanoparticulate systems such as carbon black, nanotubes, metal particles, metal oxide particles. The composition preferably also contains less than 0.1% by weight, particularly preferably is free from, pigments based on insoluble pigments, such as are described for example in DE 10057165 A1 and in WO 2007/135032 A2.

The compositions particularly preferably contain mould release agents based on a fatty acid ester, preferably based on a stearic ester, especially preferably based on pentaerythritol. It is preferable to employ pentaerythritol tetrastearate (PETS) and/or glycerol monostearate (GMS).

The composition employed for regions of the substrate layer/for the substrate layer optionally further contains an ultraviolet absorber. Suitable UV absorbers are compounds having the lowest possible transmittance below 400 nm and the highest possible transmittance above 400 nm. Such compounds and the production thereof are known from the literature and are described for example in EP 0 839 623 A1, WO 1996/15102 A2 and EP 0 500 496 A1. Ultraviolet absorbers particularly suitable for use in the composition according to the invention are benzotriazoles, triazines, benzophenones and/or arylated cyanoacrylates.

In a particularly preferred embodiment the composition employed for the substrate layer contains UV absorbers.

The following ultraviolet absorbers are suitable for example: Hydroxybenzotriazoles, such as 2-(3',5'-bis(1,1-dimethylbenzyl)-2'-hydroxyphenyl)benzotriazole (Tinuvin® 234, BASF AG. Ludwigshafen), 2-(2'-hydroxy-5'-(tert-octyl)phenyl)benzotriazole (Tinuvin® 329, BASF AG. Ludwigshafen), 2-(2'-hydroxy-3'-(2-butyl)-5'-(tert-butyl) phenyl)benzotriazole (Tinuvin® 350, BASF AG. Ludwigshafen), bis(3-(2H-benzotriazolyl)-2-hydroxy-5-tert-octyl)methane, (Tinuvin® 360, BASF AG. Ludwigshafen), (2-(4,6-diphenyl-1,3,5-triazin-2-yl)-5-(hexyloxy)phenol (Tinuvin® 1577, BASF AG. Ludwigshafen), the benzophenones 2,4-dihydroxybenzophenone (Chimasorb® 22, BASF AG. Ludwigshafen) or 2-hydroxy-4-(octyloxy)benzophenone (Chimassorb® 81, BASF AG. Ludwigshafen), 2-cyano-3,3-diphenyl-2-propenoic acid, 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, BASF AG. Ludwigshafen) or tetraethyl-2,2'-(1,4-phenylenedimethylidene)bismalonate (Hostavin® B-Cap, Clariant AG). It is also possible to use mixtures of these ultraviolet absorbers.

The thermoplastic compositions more preferably also contain at least one further heat stabilizer/processing stabilizer.

As such, phosphites and phosphonites and also phosphines are preferred. Examples include triphenyl phosphite, diphenyl alkyl phosphite, phenyl dialkyl phosphite, tris (nonylphenyl) phosphite, trilauryl phosphite, trioctadecyl phosphite, distearyl pentaerythritol diphosphite, tris(2,4-di-tertbutylphenyl) phosphite, diisodecyl pentaerythritol diphosphite, bis(2,4-di-tert-butylphenyl) pentaerythritol diphosphite, bis(2,4-di-cumylphenyl) pentaerythritol diphosphite, bis(2,6-di-tert-butyl-4-methylphenyl) pentaerythritol diphosphite, diisodecyloxy pentaerythritol diphosphite, bis(2,4-ditert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenzo[d,g]-1,3,2-dioxaphosphocine, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl)pentaerythritol diphosphite, triphenylphosphine (TPP), trialkylphenylphosphine, bisdiphenylphosphinoethane or a trinaphthylphosphine. Especially preferably employed are triphenylphosphine (TPP), Irgafos® 168 (tris(2,4-di-tert-butyl-phenyl) phosphite) or tris(nonylphenyl) phosphite or mixtures thereof. Also employable are alkyl phosphates, for example mono-, di- and trihexyl phosphate, triisoctyl phosphate and trinonylphosphate.

Also employable are phenolic antioxidants such as alkylated monophenols, alkylated thioalkylphenols, hydroquinones and alkylated hydroquinones. Particularly preferably employed are Irganox® 1010 (pentaerythritol-3-(4-hydroxy-3,5-di-tert-butylphenyl) propionate; CAS: 6683-19-8) and/or Irganox 1076® (2,6-di-tert-butyl-4-(octadecanoxycarbonylethyl)phenol).

The colorants and other additives may for example be introduced into the composition by mixing 2% to 5% by weight based on the overall composition of polycarbonate powder containing the colorants and other additives with a polycarbonate base material, where the polycarbonate in powder form may have a different MVR than the base material. The molecular weight or MVR of the polycarbonate in the composition is given by the total polycarbonate present in the composition.

Since the covers may be relatively large and may have a complex geometry for the infrastructure or transport sector, the thermoplastic composition used for the substrate layer should ideally have a sufficient flowability to be able to be processed into corresponding moulded articles in injection moulding processes, for example especially the injection-compression moulding process.

The multilayer article comprises not only the substrate layer but also one or more topcoat layers. In the sense of the invention, these layers preferably fulfil the function of scratch resistance layers and/or weathering protection layers. The topcoat layers are applied either on one side or on both sides, but are at least applied on that side of the cover that is intended to lie on the outside of the cover when installed in the vehicle, especially motor vehicle, in other words on the side oriented towards the environment. On that side of the cover that is intended to face the vehicle interior, it is possible, optionally, for there to be additional functional layers such as anti-fog, anti-dust and/or anti-reflection layers, provided that they do not significantly attenuate the signal of the LiDAR sensor.

The topcoat layer a lying on that side of the substrate layer that is facing the surroundings of the vehicle consists of a scratch resistance layer (hardcoat, topcoat). This coat is a polysiloxane coat produced by the sol-gel process. The silicon dioxide present in the topcoat layer has a $D_{90}$, determined by means of scanning transmission electron microscopy, of less than 0.50 µm, preferably less than 0.20 µm, more preferably less than 100 nm, very preferably less than 50 nm, especially preferably less than 30 nm, most preferably 15 to 30 nm. With very particular preference the $D_{100}$ as well, determined by means of scanning transmission electron microscopy, is less than 50 nm, especially less than 30 nm. The topcoat layer contains no particles, i.e. particles of other fillers, etc., having a $D_{90}$, determined by means of scanning transmission electron microscopy, ≥0.50.

"On the side facing the surroundings of the vehicle" means the side of the substrate material that is opposite the side on which the LiDAR sensor is disposed.

The topcoat layer situated on the side of the substrate layer facing the surroundings of the vehicle comprises additionally, with particular preference, at least one UV absorber. The topcoat layer is selected so as to have abrasion and scratch resistance.

Various methods for producing a topcoat layer on plastics articles are known. These systems may be applied for example by immersion processes, spin coating, spraying processes or flow coating, preferably by immersion or flow processes. Curing may be effected thermally or by UV irradiation. The topcoat layer may be applied for example directly or after preparation of the substrate surface with a primer. The topcoat layer may also be applied via plasma-assisted polymerization processes, more particularly via an $SiO_2$ plasma. Anti-fogging or anti-reflection coatings, especially those to be applied to the side and intended to face the interior of the vehicle, may likewise be produced via plasma processes. It is also possible to use certain injection moulding processes, for example overmoulding of surface-treated foils, to apply a topcoat layer to the resultant moulded article. Various additives, for example UV absorbers, derived for example from triazoles, triazines, resorcinols or benzophenones, may be present in the topcoat layer.

In a preferred embodiment which produces particularly good weathering stability, the cover comprises a topcoat layer with the function of a scratch resistance layer and/or weathering protection layer (layer a') based on polysiloxane, comprising i. at least one UV absorber from the group of benzophenones, resorcinols, 2-(2-hydroxyphenyl)benzotriazoles, hydroxyphenyl-s-triazines, 2-cyanoacrylates, oxalanilides
and/or a UV inhibitor from the group of the sterically hindered amines (HALS), based more particularly on 2,2,6,6-tetramethylpiperidine or derivatives thereof; with particular preference the topcoat layer comprises a UV absorber based on benzophenone or dibenzophenone having a silyl side chain, ii. at least one combination of an organically modified silane with a silica sol, the organically modified silane preferably being a methyltrialkoxysilane or dimethyldialkoxysilane, where the topcoat layer comprises silicon dioxide particles having a $D_{90}$, determined by means of scanning transmission electron microscopy, of less than 0.50 µm, and containing no particles having a $D_{90}$, determined by means of scanning transmission electron microscopy, ≥0.50 µm, and optionally, in a further-preferred embodiment, additionally a primer layer based on a polymethyl methacrylate (layer a") and disposed on the substrate layer, this primer layer functioning as an adhesion promoter between the polysiloxane-based topcoat layer and the substrate layer, comprising at least one UV absorber from the group of benzophenones, resorcinols, 2-(2-hydroxyphenyl)benzotriazoles, hydroxyphenyl-s-triazines, 2-cyanoacrylates, oxalanilides and/or sterically hindered amines (HALS), in particular based on 2,2,6,6-tetramethylpiperidine and derivatives thereof, wherein the thickness of the primer layer is 0.3 μm to 8 μm, preferably 1.0 μm to 4.0 μm.

The proportion of the UV absorber in the primer layer is up to 35% by weight. "Based on X" in relation to the UV absorber means that the structure thereof is derived from the compound of the formula X and may have one or more substitutions, ring fusions, etc.

With particular preference, the cover comprises no layers other than the substrate layer and one or more topcoat layers, and also, optionally, one or more primer layers.

The primer composition (primer solution) used here to form the primer layer consists with particular preference of
a) one or more poly(methyl) methacrylate binders,
b) one or more solvents, preferably from the group of the glycol ethers,
c) one or more UV absorbers, and
d) optionally one or more sterically hindered amines (HALS) and
e) optionally flow control additives. These are additives whose purpose is to achieve more effective wetting of the substrate, i.e. of the surface to be coated, and/or to improve the surface smoothness. Hence the flow control additive in the primer layer serves for more effective wetting of the substrate layer.

The topcoat layer composition used in this context consists with particular preference of
a) one or more alkoxysilanes, preferably methyltrimethoxysilane or methyltriethoxysilane,
b) a silica sol having a preferred mean particle size $D_{50}$, determined by means of scanning transmission electron microscopy, of less than 50 nm, more particularly of 15 to 30 nm,
c) one or more solvents, preferably from the group of alcohols and water,
d) one or more UV absorbers, preferably based on benzophenone according to structure (I) and/or dibenzophenone according to structure (II) and/or (III) having a silyl side chain

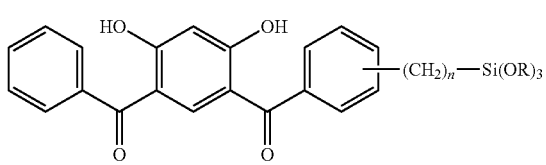

(I)

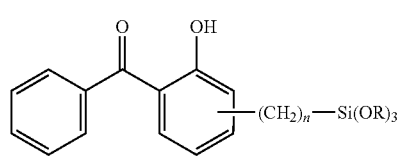

(II)

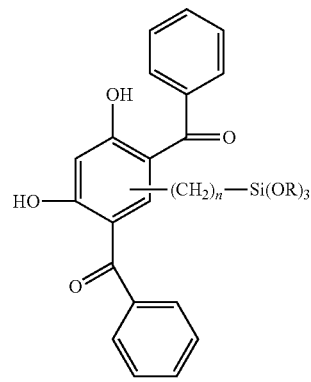

(III)

where n=1 to 10, preferably 2 to 4; R=methyl, ethyl, propyl,
e) optionally one or more sterically hindered amines (HALS) and
f) optionally one or more poly(methyl) methacrylate binders and
g) optionally flow control additives.

"Derivatives" are understood in accordance with the invention to mean those compounds having a molecular structure having a different atom or a different atomic group in place of a hydrogen atom or a functional group or in which one or more atoms/atomic groups have been removed. The parent compound thus still remains recognizable.

Preference is given to using a UV absorber-containing primer in order to improve the adhesion of the scratch-resistant lacquer on the substrate layer. The primer preferably contains further stabilizers, for example HALS systems (stabilizers based on sterically hindered amines), adhesion promoters and/or flow enhancers. The respective resin forming the base material of the primer layer may be selected from a multiplicity of materials and is described for example in Ullmann's Encyclopaedia of Industrial Chemistry, 5$^{th}$ Edition, Vol. A18, pp. 368-426, VCH, Weinheim 1991. Polyacrylates, polyurethanes, phenol-based systems, melamine-based systems, epoxy systems and alkyd systems or mixtures of these systems may be employed. The resin is usually dissolved in suitable solvents—often in alcohols. Depending on the selected resin the curing may be effected at room temperature or at elevated temperatures. Preference is given to using temperatures between 20° C. (room temperature) and 130° C.—often after a large part of the solvent has been removed over a short period at room temperature. Commercially obtainable primer systems include for example SHP470, SHP470-FT2050 and SHP401 from Momentive Performance Materials. Such coatings are described for example in U.S. Pat. No. 6,350,512 B1, U.S. Pat. No. 5,869,185 A, EP 1308084 A1 and WO 2006/108520 A1.

The polysiloxane layer preferably contains organosilicon compounds having the formula $R_nSiX_{4-n}$ and/or partial condensates thereof,
wherein the radicals R are identical or different and represent a linear or branched, saturated or mono- or polyunsaturated or aromatic hydrocarbon radical,
the radicals X are identical or different and represent hydrolysable groups or hydroxyl groups, preferably halogen, in particular chlorine or bromine, alkoxy groups, alkylcarbonyl groups or alkoxy groups and n is 0, 1, 2 or 3, preferably 1 or 2, very particularly preferably 1.

R preferably represents saturated, branched or unbranched alkyl radicals having 1 to 20 carbon atoms and/or represents mono- or polyunsaturated branched or unbranched alkenyl radicals having 2 to 20 carbon atoms or aromatic groups having 6 to 12 carbon atoms. The alkyl/alkenyl radicals more preferably have up to 12, yet more preferably up to 8, carbon atoms. More preferably, all radicals are methyl and/or phenyl groups.

More preferably, X is an alkoxy group, most preferably a $C_1$- to $C_4$-alkoxy group, for example a methoxy group or an ethoxy group.

The silicon compounds $R_nSiX_{4-n}$ are hydrolysable and condensable via the X radicals. An inorganic network comprising Si—O—Si units is constructed via these hydrolytically condensable groups. In contrast to the X radicals, the R radicals are stable to hydrolysis under the typical condensation conditions.

When using the abovementioned siloxane-based topcoat systems, dry layer thicknesses of 3 μm-20 μm are preferred, more preferably 3.5 μm-15 μm, particularly preferably 4 μm-12 μm. By "dry layer thickness" is meant the layer thickness of the coating after application, evaporation of the solvent and subsequent thermal or UV curing. This layer thickness is valid generally for preferred topcoat layers. The layer thickness may be determined for example by white light interferometry (for example by means of a white light interferometer from Eta Optic; ETA-SST), which is preferred. Cross section preparation and microscopic detection (by AFM or scanning electron microscopy) of the layers may also be used to detect the thickness via material contrast.

Optionally, if no primer layer is intended, the topcoat layer a' may comprise a poly(meth)acrylate binder as adhesion-promoting component. Commercial binders may be Joncryl products from BASF.

As described above, instead of primer/topcoat layer combinations it is also possible to employ one-component hybrid systems that are either thermally- or UV-curing for the multilayer articles which form the cover.

Thermally curing systems are inter alia hybrid systems and are described for example in EP 0570165 A2, WO 2008/071363 A2 or DE 2804283 A. Hybrid systems are known and available commercially in the form, for example, of thermally curing systems. UV-curing systems of the kind nowadays also used on plastic cover discs are, by way of example, commercially available UV-curing or thermally curing coating systems and are available, for example, from Momentive Performance Materials and from Redspot.

In a particularly preferred process for producing the covers for the vehicles according to the invention, the topcoat layer and optionally the primer layer is/are applied via the flow-coating process, since it results in coated parts having a high optical quality.

The flow-coating process can be effected manually with a hose or suitable coating head, or automatically in a continuous run by means of flow-coating robots and optionally slot dies. The component parts may here be coated either hanging or stored in an appropriate goods carrier. For larger and/or 3D component parts—i.e. component parts having a three-dimensional surface which thus also have a geometry departing from that of a sheet—the part to be coated is suspended in or placed upon a suitable goods carrier.

Other possible methods of application are immersion, all spraying and injecting methods, knifecoating, roll coating, or spin coating, preferably spraying and injecting, using spray guns, for example, in flat spraying units or by means of high-speed rotating bells. The component parts may here be coated either hanging or stored in an appropriate goods carrier.

For small parts the coating may also be performed by hand. Here, the to-be-layered liquid primer or lacquer solution for forming the protective layer is poured over the sheet in the longitudinal direction starting from the upper edge of the small part while simultaneously the starting point of the lacquer on the sheet is passed from left to right over the sheet width. The coated sheets are aired and cured according to the respective manufacturer instructions while hanging vertically by a clamp.

Entirely surprisingly it has been found that organic coating systems are less suitable for an apparatus comprising a LiDAR sensor. Such systems include, for example, UV-crosslinkable systems such as urethane acrylates with and without inorganic nanoparticles.

Particular preference is given to a
sensor system and additionally, in particular, to a vehicle, comprising
a) a LiDAR sensor which emits laser light having a wavelength in the range from 800 to 1600 nm, more particularly from 880 nm to 950 nm and/or from 1520 to 1570 nm, and
b) a cover surrounding all or part of the LiDAR sensor and comprising a multilayer article, comprising, in this order,
a substrate layer comprising a thermoplastic composition based on aromatic polycarbonate having a melt volume rate MVR of 8 to 20 cm³/(10 min), determined according to ISO 1133-1:2012-03 (300° C., 1.2 kg),
where the substrate layer has a light transmission in the range from 380 to 780 nm of less than 25.0%, preferably up to 20%, more preferably less than 15%, determined at a layer thickness of 4 mm according to DIN ISO 13468-2:2006 (D65, 10°),
and where the substrate layer in its respective thickness has a transmission for IR radiation in the range from 800 to 1600 nm, more particularly in the range from 880 nm to 950 nm and/or from 1520 to 1570 nm, of at least 55%, preferably at least 60%, more preferably at least 65%, determined according to DIN ISO 13468-2:2006,
and wherein the thermoplastic composition consists of
i) at least 85% by weight, more preferably at least 95% by weight, of aromatic polycarbonate,
ii) at least one green and/or one blue colorant selected from the group consisting of the colorants of formulae (1), (2a-c), (3), (4a), (4b), (5), (6), (7) and/or (8) and
iii) at least one red and/or violet colorant selected from the group consisting of the colorants of formulae (9), (10), (11), (12), (13), (14a), (14b) and/or (15),
iv) optionally further colorants, preferably selected from the group consisting of the colorants of formulae (16), (17), (18), (19) and/or (20),
v) optionally heat stabilizers, mould release agents, UV absorbers, flame retardants, antistats and/or flow improvers, preferably in an amount of 0% to 10% by weight, more preferably 0% to 3% by weight,
vi) 0% to less than 5.0% by weight of further thermoplastic polymers,
vii) 0% to less than 0.005% by weight of carbon black, wherein the sum of the colorants ii) to iv) is >0.001% by weight, more preferably >0.005% by weight, yet more preferably >0.008% by weight, and wherein the thickness of the substrate layer is 1.0 to 6.0 mm, preferably 2 to 4 mm, more preferably 2.0 to 4.0 mm, optionally a primer layer based on polymethyl methacrylate and comprising at least one UV absorber, and a ppolysiloxane-based topcoat layer comprising a combination of an organically modified silane with a silica sol, the topcoat layer comprising silicon dioxide particles having a $D_{90}$, determined by means of scanning transmission electron microscopy, of less than 0.50 μm, and comprising no particles having a $D_{90}$, determined by means of scanning transmission electron microscopy, ≥0.50 μm, where the topcoat layer is on the side of the substrate layer which is opposite the side of the substrate layer on which the LiDAR sensor is disposed.

Very particular preference is given to a sensor system, additionally, in particular, a vehicle as well, comprising a) a LiDAR sensor which emits laser light having a wavelength in the range from 800 to 1600 nm, more particularly from 880 nm to 950 nm and/or from 1520 to 1570 nm, and b) a cover surrounding all or part of the LiDAR sensor and comprising, preferably consisting of, a multilayer article, comprising, in this order, a substrate layer based on aromatic polycarbonate having a melt volume rate MVR of 8 to 20 cm$^3$/(10 min), determined according to ISO 1133-1:2012-03 (300° C., 1.2 kg), having a light transmission in the range from 380 to 780 nm of less than 1.0%, determined at a layer thickness of 4 mm according to DIN ISO 13468-2: 2006 (D65, 10°), and having a transmission for IR radiation in the range from 800 to 1600 nm, more particularly in the range from 880 nm to 950 nm and/or 1520 to 1570 nm, of at least 60%, more preferably of at least 65%, determined according to DIN ISO 13468-2:2006, wherein the thermoplastic composition consists of i) at least 85% by weight, more preferably at least 95% by weight, of aromatic polycarbonate, ii) at least one green and/or one blue colorant selected from the group consisting of the colorants of formulae (1), (2a-c), (3), (4a), (4b), (5), (6), (7) and/or (8) and iii) at least one red and/or violet colorant selected from the group consisting of the colorants of formulae (9), (10), (11), (12), (13), (14a), (14b) and/or (15), iv) optionally further colorants, preferably selected from the group consisting of the colorants of formulae (16), (17), (18), (19) and/or (20), v) optionally heat stabilizers, mould release agents, UV absorbers, flame retardants, antistats and/or flow enhancers, preferably in an amount of 0% to 3% by weight, vi) 0% to less than 5.0% by weight of further thermoplastic polymers, vii) 0% to less than 0.005% by weight of carbon black, wherein the sum of the colorants ii) to iv) is >0.001% by weight, more preferably >0.005% by weight, yet more preferably >0.008% by weight, and wherein the thickness of the substrate layer is 1.0 to 6.0 mm, preferably 2 to 4 mm, more preferably 2.0 to 4.0 mm, and optionally a primer layer based on polymethyl methacrylate and comprising at least one UV absorber, and a polysiloxane-based topcoat layer comprising a combination of an organically modified silane with a silica sol, the topcoat layer comprising silicon dioxide particles having a $D_{90}$, determined by means of scanning transmission electron microscopy, of less than 50 nm, preferably less than 30 nm, and comprising no particles having a $D_{90}$, determined by means of scanning transmission electron microscopy, ≥0.50 μm, where the topcoat layer is on the side of the substrate layer that is opposite the side of the substrate layer on which the LiDAR sensor is disposed, and where the topcoat layer with particular preference comprises at least one UV absorber, preferably a UV absorber incorporated into the siloxane network. UV absorbers incorporated into the siloxane network contain alkoxysilane groups which are able to hydrolyse in the siloxane coating material (sol-gel system used) and which on curing are incorporated chemically into the siloxane network.

On the side of the cover that is intended to face the inside of the vehicle, it is possible for protective layers to be positioned in order to improve the media resistance, and also such layers having antidust, anti-fog and/or anti-reflection properties.

Non-limiting examples of anti-fog and anti-dust coatings are the particle-free MODIPER H5000 or MODIPER H9800-UV from NOF Corporation, GXC NuGlass® AFPC (Polycarbonate) from GXC Coatings, or else layers obtained by flame silicatizing.

Valid anti-reflection layers are all single-ply or multi-ply layer constructions having as their outer layer a layer of low refractive index ($n_D$<1.5). Use of the above-described composition based on aromatic polycarbonate for substrate layers and the scratch-resistant layer provided in accordance with the invention provides covers for LiDAR sensors with which at the same time, on the one hand, a very wide variety of electrical, electronic, optoelectronic and optical functional elements may be covered without impairing their function, both in relation to the vehicle and its occupants and in relation to the external environment, such that said function is no longer fulfilled as intended, and with which, on the other hand, attractive colourings in the human-visible spectral range of light are achievable, in particular a glass-like black impression.

The production of three-dimensional substrate layers, but also sheetlike layers, starting from the above-described polymer composition containing the abovementioned components is effected with commonly used incorporation methods by combining, mixing and homogenizing, wherein in particular homogenizing preferably takes place in the melt under the action of shear forces. To this end, the thermoplastic polymer, preferably aromatic polycarbonate, and any further components of the polymer moulding material, preferably of the polycarbonate moulding material, are mixed, extruded and granulated in the melt under customary conditions in customary melt mixing assemblies such as for example in single-screw or multi-screw extruders or in kneaders. The additives may be metered in either separately as granulates/pellets via weigh feeders or side feed devices or else metered into the solids conveying region of the extruder or into the polymer melt at elevated temperature as a melt by means of metering pumps. The masterbatches in the form of granules or pellets may also be combined with other particulate compounds to afford a premixture and then supplied together into the solids conveying region of the extruder or into the polymer melt in the extruder via metering hoppers or side feed devices. The compounding assembly is preferably a twin-screw extruder, particularly preferably a twin-screw extruder having corotating screws, wherein the twin-screw extruder preferably has a screw length/diameter ratio of 20 to 44, particularly preferably of 28 to 40. Such a twin-screw extruder comprises a melting zone and a mixing zone or a combined melting and mixing zone and optionally a degassing zone where an absolute pressure p of preferably not more than 800 mbar, more preferably not more than 500 mbar, particularly preferably not more than 200 mbar, is established. The average residence time of the mixture composition in the extruder is preferably limited to not more than 120 seconds, more preferably not more than 80 seconds, more preferably not more than 60 seconds. In a preferred embodiment the temperature of the melt of the polymer/of the polymer alloy at the extruder outlet is 200° C. to 400° C.

In addition to extrusion the compositions employed for the substrate layer may be converted into the substrate layer by hot press moulding, spinning, blow moulding, deep drawing or injection moulding. Injection moulding or injection-compression moulding is preferred here.

Injection moulding processes are known to those skilled in the art and described for example in "Handbuch Spritzgieβen", Friedrich Johannnaber/Walter Michaeli, Munich; Vienna: Hanser, 2001, ISBN 3-446-15632-1 or in "Anleitung zum Bau von SpritzgieBwerkzeugen", Menges/Michaeli/Mohren, Munich; Vienna: Hanser, 1999, ISBN 3-446-21258-2.

Injection moulding is here to be understood as comprising all injection moulding processes including multicomponent injection moulding and injection-compression moulding processes.

Injection-compression moulding processes differ from conventional injection moulding processes in that the injection and/or solidification procedure includes mould plate movement. In the known injection moulding process, the mould plates are already opened slightly before the injection procedure to compensate for the shrinkage occurring during subsequent solidification and to reduce the required injection pressure. A pre-enlarged cavity is therefore already present at the beginning of the injection procedure. Flash faces of the mould ensure that the pre-enlarged cavity is still sufficiently leakproof even when the mould plates have been somewhat opened. The plastics composition is injected into this pre-enlarged cavity and is simultaneously/subsequently compressed as the mould moves towards the closed position. Particularly in the production of large surface area and thin-walled mouldings having long flow paths, the more complex injection-compression moulding technique is preferred or in some cases essential. A reduction of the injection pressures required for large mouldings is achieved only in this way. Furthermore, stresses/warpage in the injection-moulded part arising from high injection pressures can be avoided by injection-compression moulding.

The cover is preferably integrated into the vehicle body via non-IR-transparent regions. "Non-IR-transparent" is to be understood here as meaning a transmission in the non-IR-transparent region in its respective thickness of less than 65% in the range from 800 to 1600 nm, more particularly from 800 nm to 950 nm and 1520 to 1570 nm, determined according to DIN ISO 13468 2:2006. These are nontransparent layers, preferably made of a polymer blend, more preferably made of a polycarbonate blend, preferably comprising polycarbonate as the predominantly present component, very particularly preferably comprising an ABS (acrylonitrile-butadiene-styrene) or polyester as blend partner. Such a nontransparent layer is over large regions in direct contact with the above-described layer construction made of the substrate layer and the optionally present protective layer.

Upon shaping of the non-IR-transparent material to match the cover employed according to the invention, the junction between the materials is preferably in edge regions so that any irregularities are concealed. In every case there are regions in which the substrate layer is disposed upon the non-IR-transparent layer or the non-IR-transparent layer is disposed upon the substrate layer. "Disposed upon" is here to be understood as meaning an overlapping of the layers when the cover is viewed perpendicularly to the joining face of the individual layers. It will be appreciated that the non-IR-transparent layer need not be but may be in direct contact with the substrate layer since it may be arranged behind further layers.

These non-IR transparent materials function in particular as reinforcing frame elements. Reinforcing frame elements are preferably produced using thermoplastics containing fillers and/or reinforcers.

The fillers and/or reinforcers used are typically in the form of fibres, platelets, tubes, rods or are spherical or particulate. Suitable fillers and reinforcers include for example talc, wollastonite, mica, kaolin, diatomaceous earth, calcium sulfate, calcium carbonate, barium sulfate, glass fibres, glass or ceramics spheres, hollow glass spheres or hollow ceramics spheres, glass or mineral wool, carbon fibres or carbon nanotubes. Preferred fillers are fillers which bring about an isotropic shrinkage behaviour of the composition.

The use of talc and short glass fibres is particularly preferred.

Glass or ceramics spheres or hollow spheres can increase the scratch resistance of this surface.

In parts of the substrate layer not arranged in front of the LiDAR sensor, i.e. not covering said sensor with respect to the surroundings, the substrate layer may also comprise materials containing fillers and reinforcers. The proportion thereof is preferably 5% by weight to 40% by weight, preferably 7% by weight to 30% by weight, more preferably 8% by weight to 25% by weight, wherein the weight fractions relate to the overall composition of the substrate layer.

The covers comprising/made of the opaque substrate layers—optionally with one or more primer layers and one or more topcoat layers—may be applied on any desired carrier systems made of metal or plastic in vehicle construction. This may be achieved by means of special adhesive systems, for example polyurethane-based adhesive systems. The combination of the LiDAR sensor and the cover may be installed in a vehicle as one unit; but the LiDAR sensor and the cover may likewise be installed separately. It is preferable when the LiDAR sensor is initially installed and then the cover, in particular a front panel, is subsequently placed in front of the LiDAR sensor.

In the context of the present invention preferred embodiments recited for individual features may also be combined with one another provided they are not contradictory.

FIGURES

EXAMPLES

Figure 1:
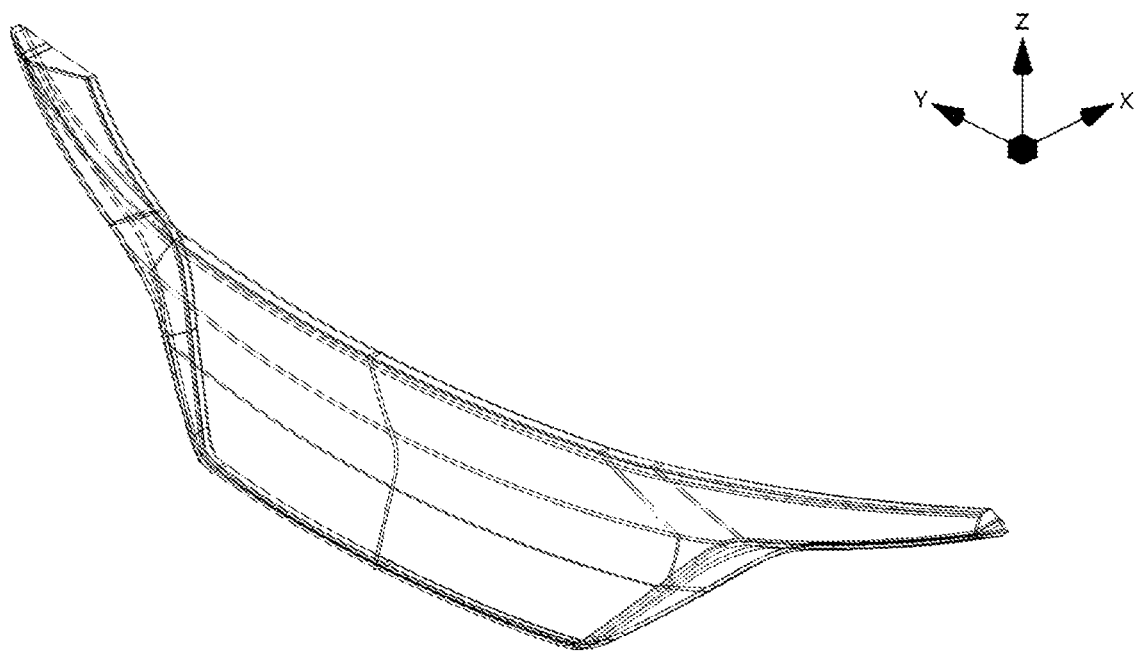
FIG. 1 shows a front panel as an example for a cover according to the invention.
Figure 2:
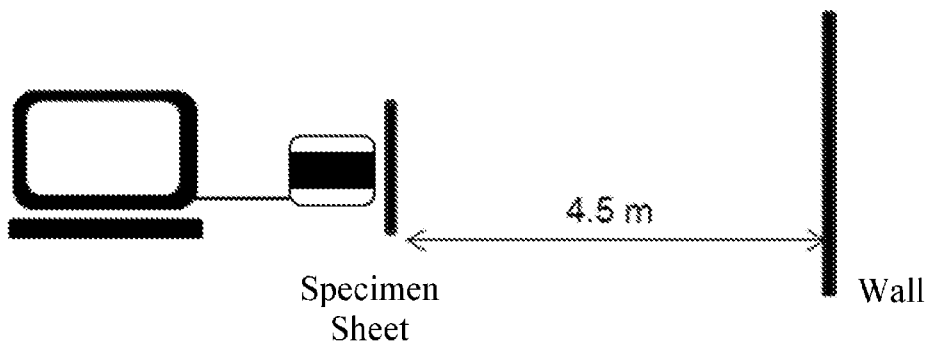
FIG. 2 shows the experimental set up used in the examples section.

The invention is described in more detail hereinafter with reference to examples.

Substrate Material 1: For Comparative Example

Composition containing 99.99984% by weight of polycarbonate from Covestro Deutschland AG having an MVR of about 12 cm$^3$/10 min measured at 300° C. at a loading of 1.2 kg (according to ISO 1133-1:2012-03) and based on bisphenol A and terminated with phenol. The composition also contained 0.00006% by weight of Macrolex Violet 3R (colorant of formula (12)) and 0.0001% by weight of Macrolex Blue RR (colorant of formula (7)).

Substrate Material 2: For Comparative Example

Composition containing 99.8% by weight of polycarbonate from Covestro Deutschland AG having an MVR of about 12 cm$^3$/10 min measured at 300° C. at a loading of 1.2 kg (according to ISO 1133-1:2012-03) and based on bisphenol A and terminated with phenol. The composition also contained 0.1% by weight of Solvent Blue 36 (further colorant) and 0.1% by weight of Macrolex Green G (colorant of formula (2)).

Substrate Material 3: For Comparative Example

Composition containing 99.8000% by weight of polycarbonate from Covestro Deutschland AG having an MVR of about 12 cm$^3$/10 min measured at 300° C. at a loading of 1.2 kg (according to ISO 1133-1:2012-03) and based on bisphenol A and terminated with phenol. The polycarbonate contained 0.134% by weight of Solvent Blue 36 (further colorant), 0.044% by weight of Macrolex Orange 3G (colorant of formula (17)) and 0.022% by weight of Amaplast Yellow GHS (Solvent Yellow 163, colorant of formula (18)).

Substrate Material 4: For Comparative Example

Composition containing 99.84% by weight of polycarbonate from Covestro Deutschland AG having an MVR of about 12 cm$^3$/10 min measured at 300° C. at a loading of 1.2 kg (according to ISO 1133-1:2012-03) and based on bisphenol A and terminated with phenol. The material contained 0.16% by weight of carbon black.

Substrate Material 5: For Comparative Example

Composition containing 93.195850% by weight of polycarbonate from Covestro Deutschland AG having an MVR of about 18 cm$^3$/10 min measured at 300° C. at a loading of 1.2 kg (according to ISO 1133-1:2012-03) and based on bisphenol A and terminated with tert-butylphenol. The composition additionally contained 6.756% by weight of Kronos 2230 (titanium dioxide), 0.00006% by weight of Macrolex Yellow 3G (colorant of formula (16)), 0.00009% by weight of Macrolex Violet 3R (colorant of formula (12)) and 0.054% by weight of Tinopal (2,5-thiophenyldibis(5-tert-butyl-1,3-benzoxazene); optical brightener).

Substrate Material 6: For Comparative Example

Composition containing 99.435% by weight of polycarbonate from Covestro Deutschland AG having an MVR of about 12 cm$^3$/10 min measured at 300° C. at a loading of 1.2 kg (according to ISO 1133-1:2012-03) and based on bisphenol A and terminated with phenol. The polycarbonate contained 0.1% of Kronos 2230 (titanium dioxide), 0.03% of Sicotan Yellow K2107 (Pigment Brown 24, CAS 68186-90-3; further colorant), 0.022% of Heucodur Blue 2R from Heubach (Pigment Blue 28, cobalt-aluminate blue spinel, CAS 1345-16-0; further colorant), 0.35% of Macrolex Red EG (structure 10) and 0.063% of Bayferrox 110 M from Lanxess AG ($Fe_2O_3$; CAS 001309-37-1).

Substrate Material 7: For Comparative Example

Polycarbonate/ABS blend from Covestro Deutschland AG having an MVR of about 17 cm$^3$/10 min measured at 260° C. at a loading of 5.0 kg (according to ISO 1133-1:2012-03) and having an ABS proportion of about 30% by weight and an SAN content of about 10% by weight. The material contained no colorants.

Substrate Material 8: For Comparative Example

Composition containing 99.96% by weight of polycarbonate from Covestro Deutschland AG having an MVR of about 12 cm$^3$/10 min measured at 300° C. at a loading of 1.2 kg (according to ISO 1133-1:2012-03) and based on bisphenol A and terminated with phenol. The composition contained 0.04% by weight of carbon black.

Substrate Material 9: For Comparative Example

Composition containing 99.78% by weight of polycarbonate from Covestro Deutschland AG having an MVR of about 12 cm$^3$/10 min measured at 300° C. at a loading of 1.2 kg (according to ISO 1133-1:2012-03) and based on bisphenol A and terminated with phenol. The composition contained 0.02% by weight of carbon black and 0.2% by weight of Macrolex Violet B (colorant of formula (13)).

Substrate Material 10: For Inventive Example

Composition containing 99.874% by weight of polycarbonate from Covestro Deutschland AG having an MVR of about 18 cm$^3$/10 min measured at 300° C. at a loading of 1.2 kg (according to ISO 1133-1:2012-03) and based on bisphenol A and terminated with tert-butylphenol. The composition also contained 0.048% by weight of Macrolex Orange 3G (colorant of formula (17)), 0.01% by weight of Macrolex Violet B (colorant of formula (13)) and 0.068% by weight of colorant of formula 4a/4b (1:1).

Substrate Material 11: For Inventive Example

Composition containing 99.8% by weight of polycarbonate from Covestro Deutschland AG having an MVR of about 12 cm$^3$/10 min measured at 300° C. at a loading of 1.2 kg (according to ISO 1133-1:2012-03) and based on bisphenol A and terminated with phenol and containing 0.1% by weight of Macrolex Violet 3R (colorant of formula (12)) and 0.1% by weight of Macrolex Green 5B (colorant of formula (1)).

Substrate Material 12: For Inventive Example

Composition containing 99.894% by weight of polycarbonate from Covestro Deutschland AG having an MVR of about 12 cm$^3$/10 min measured at 300° C. at a loading of 1.2 kg (according to ISO 1133-1:2012-03) and based on bisphenol A and terminated with phenol and containing 0.0360% by weight of Macrolex Blue RR (colorant of formula (7)) and 0.07% by weight of Macrolex Violet 3R (colorant of formula (12)).

Substrate Material 13: For Comparative Example

Injection moulded colorant- and carbon black-free sheet made of polyamide 6,6 having a thickness of 3.0 mm.

Substrate Material 14: For Comparative Example

Polyether sulfone in the form of a 0.175 mm-thick Ajedium film from Solvay Solexis Inc.

Substrate Material 15: For Comparative Example

Siloxane-containing block co-condensate based on bisphenol A-containing polycarbonate having a siloxane content of 5% and produced as described in EP 3099731 A1.

Substrate Material 16: For Comparative Example

Sheet made of Altuglass-brand polymethyl methacrylate (Arkema).

Test Methods

Determination of Solids Content (Method a for Siloxane Coatings and Primers):

The solids content of the coatings was determined using the Mettler Toledo HB43 solids tester, in which a weighed sample of coating was evaporated at 140° C. until constant mass was reached. The solids content is then given in percent from the ratio of mass after to mass before evaporation. The solids content of the coating after curing of the coating here in the simplest case is the weight of coating minus the weight of solvent.

Solids Content Determination (Method B for UV Coating Systems):

The solids content of the coatings was determined using the Mettler Toledo HB43 solids tester, in which a weighed sample of coating was evaporated at 110° C. until constant mass was reached. The solids content is then given in percent from the ratio of mass after to mass before evaporation. The solids content of the coating after curing of the coating here in the simplest case is the weight of coating minus the weight of solvent.

Multilayer Article 1: Comparative Example

Multilayer article 1 comprising substrate material 11 with a topcoat layer containing silicon dioxide particles having a particle size of 4 μm (Amosil FW600; fired silicon dioxide Amosil FW 600 from Quarzwerke GmbH at Frechen, with a mean particle size of around 4 μm, a $D_{10}/D_{90}$ ratio of around 1.5/10 [μm/μm] determined by Cilas Granulometer; ISO 13320:2009 (particle measurement by laser light scattering) and a specific surface area of around 6 m$^2$/g, determined according to DIN ISO 9277 (DIN-ISO 9277:2014-01).

Production of the Coating Material:

In a flask equipped with a stirrer and condenser, 27.5 g of methyltrimethoxysilane were mixed with 0.2 g of concentrated acetic acid.

In a further vessel, 5.0 g of Joncryl 587 were dissolved in a mixture of 6.0 g each of isopropanol and n-butanol. Using a dissolver, 6.8 g of Amosil FW 600 were subjected to high-shear dispersing for 30 minutes, after which 15.7 g of deionized water were added.

With stirring, the previously prepared Joncryl 587/Amosil FW 600-dispersion was added slowly to the acidified methyltrimethoxysilane.

The batch was diluted with 15.5 g each of isopropanol and n-butanol, and 0.1 g of tetra-n-butylammonium acetate (TBAA) was added.

The solids of the sol-gel coating material was adjusted, using a 1:1 solvent mixture of isopropanol and n-butanol, to a solids content of 25% as measured by Method A for siloxane coatings and primers.

Solids Content: 25%
pH: 6.0

The topcoat layer was applied by hand by means of a flow coating process. To form the protective layer, the coating, starting from the top edge of a polycarbonate sheet composed of substrate 11 with dimensions of 250 mm×105 mm×3.2 mm, was poured over the sheet in the lengthwise direction, while at the same time the starting point of the coating on the sheet was guided from left to right over the width of the sheet.

Hanging vertically on a bracket, the coated sheet was cured after a flash-off time of 30 minutes at 23° C. and subsequently at 130° C. for 60 minutes.

Multilayer Article 2: Comparative Example

Multilayer article comprising substrate material 11 with a topcoat layer containing silicon dioxide particles having a particle size $D_{90}$ of 1.2 μm (Amosil FW960-943 from Quarzwerke GmbH at Frechen, with a mean particle size of 1.2 μm and a specific surface area of around 14 m$^2$/g, determined according to DIN ISO 9277 (DIN-ISO 9277: 2014-01).

Production of the coating material: The coating material was produced as for multilayer article 1, but using Amosil FW 960-943 in the present example.

The solids of the sol-gel coating material was adjusted, using a 1:1 solvent mixture of isopropanol and n-butanol, to a solids content of 25% as measured by Method A for siloxane coatings and primers.

Solids Content: 25%
pH: 5.5

The coating material was applied, as for multilayer article 1, to a polycarbonate sheet composed of substrate 11 with dimensions of 250×105×3.2 mm.

Multilayer Article 3: Inventive Example

Multilayer article made of substrate material 11 with a topcoat layer containing silicon dioxide particles having a particle size of around 22 nm (Ludox AS-40 Silica, colloidal, specific surface area 140 m$^2$/g; W.R. Grace&Co.—Conn. Maryland 21044 USA).

Production of the Coating Material:

In a flask equipped with a stirrer and condenser, 27.5 g of methyltrimethoxysilane were mixed with 0.2 g of concentrated acetic acid.

In a further vessel, 17 g of Ludox AS-40 (silica sol from Grace) were mixed with 5.5 g of deionized water.

With stirring, the diluted silica sol was added to the acidified methyltrimethoxysilane and the mixture was stirred at room temperature for a further 4 hours. After the 4 hours, a further 1.7 g of concentrated acetic acid were added. To bring about the hydrolysis-condensation reaction, stirring took place at room temperature for 3 hours more.

Added to the mixture with stirring at room temperature were 21.5 g each of isopropanol and n-butanol, and 0.1 g of tetra-n-butylammonium acetate (TBAA). Subsequently 5.0 g of Joncryl 587 were dissolved in the mixture.

The solids of the sol-gel coating material was adjusted, using a 1:1 solvent mixture of isopropanol and n-butanol, to a solids content of 25% as measured by Method A for siloxane coatings and primers.

Solids Content: 25% pH: 5.0

The coating material was applied, as for multilayer article 1, to a polycarbonate sheet composed of substrate 11 with dimensions of 250×105×3.2 mm.

Multilayer Article 4: Inventive Example

A commercially available primer solution was used, having a solids content of 10.5% (method A). This primer is based on polymethyl methacrylate and also glycol ether, and contains 1-methoxy-2-propanol and diacetone alcohol as solvents and dibenzoylresorcinol as UV absorber.

In order to be within the layer thickness specification of the manufacturer, this coating material requires dilution with a 1:1 solvent mixture of diacetone alcohol:1-methoxy-2-propanol. For this purpose, the primer described above was admixed with a solution of Tinuvin 479 (a hydroxyphenyl-triazine UV absorber in methoxy-2-propanol/diacetone alcohol (1:1), to give a primer solution containing 5.00% by weight of Tinuvin 479 with a solids content of 5.9%. The coating material was subsequently filtered with a suction filter (2-4 μm cellulose filter).

Production of the Hard Coat Solution (for the Topcoat Layer):

A topcoat layer solution was used that contained Ludox AS particles with a particle diameter of around 22 nm. The solids content was around 20% by weight and the UV absorber content was around 11% by weight. The UV absorber used was a UV absorber of structure (III) (with n=3). The method for producing the topcoat layer solution is described in U.S. Pat. No. 5,041,313 A.

24.5 g of this solution were admixed with stirring with 0.88 g of glacial acetic acid (100% acetic acid), to give a hard coat solution with a 3.5% by weight addition of acetic acid, based on the total amount of coating material.

Application took place by hand. To form the layers, the liquid primer solution, starting from the top edge of the small part, in the case of a polycarbonate sheet composed of substrate 11 with dimensions of 250 mm×105 mm×3.2 mm, was poured over the sheet in the lengthwise direction, while at the same time the starting point of the coating on the sheet was guided from left to right over the width of the sheet. Hanging vertically on a bracket, the coated sheet was cured after a flash-off time of 30 minutes at 23° C. and subsequently at 130° C. for 60 minutes. Following the application of the primer layer, the topcoat material (the scratch resistance layer) was applied analogously as a topcoat layer and, after a 30-minute flash-off time at 23° C., was cured at 130° C. for 60 minutes.

Multilayer Article 5: Inventive

Multilayer article 5 corresponds to multilayer article 4 except that the below-stated substrate layer thickness is 4 mm rather than 3.2 mm.

Production and application of the primer and topcoat took place as described for multilayer article 4.

Multilayer Article 6: Inventive

Multilayer article composed of substrate material 11, corresponding to multilayer article 3 but with a different substrate layer thickness (4 mm) instead of 3.2 mm. The production of the coating material and its application took place as described in the multilayer article 3 example.

Multilayer Article 7: Comparative Example

Multilayer article composed of substrate material 11 and a UV-curing urethane acrylate coating system.

A coating solution consisting of 100 g of Desmolux VP LS2308 (ALLNEX, unsaturated aliphatic urethane acrylate), 61.0 g of Ebecryl 8301 (Cytec, hexafunctional aliphatic urethane acrylate), 4.86 g of Irgacure 814 (BASF), 1.62 g of BYK 306 (BYK), 3.78 g of Hostavin 3206 LIQ (Clariant), 1.70 g of Hostavin® 3058 LIQ (Clariant), 160 g of methoxypropanol and 160 g of diacetone alcohol was applied single-sidedly by a flow coating process to plates composed of substrate 11 in a size of 10.5 cm×15 cm×0.4 cm.

Coating took place by hand. Here, starting from the top edge of the small part, the coating solution was poured in the lengthwise direction over the sheet, while at the same time the starting point of the primer on the sheet was guided from left to right over the width of the sheet. After an evaporation time of 5 minutes, the sheet was subjected to primary curing at 75° C. for 6 minutes. This was followed by the UV curing with a dose of ~7-8 J/cm$^2$, using a mercury-doped UV lamp (80 W/cm).

Compounding

The compounding of the components to give the compositions for the substrate layers was effected in a KraussMaffei Berstorff ZE25 twin-screw extruder at a barrel temperature of 260° C., a melt temperature of about 280° C. and a speed of 100 rpm with the amounts of components specified in the examples. The coloured compositions were processed into 5 mm, 4 mm- and 3.2 mm-thick injection-moulded, rectangular polycarbonate sheets.

Pretreatment/Cleaning of the Sheets Prior to Coating

Coating took place in a controlled-atmosphere coating chamber under the respective stipulations of the coating manufacturer, at 23 to 25° C. and at 40% to 48% relative humidity.

The specimen sheets were cleaned using so-called iso wipes (LymSat® from LymTech Scientific; saturated with 70% isopropanol and 30% deionized water), rinsed off with isopropanol, dried in air for 30 minutes and blown with ionized air.

LiDAR Sensor Employed

A Velodyne Ty Puck VLP 16 LiDAR sensor was employed. Said sensor operates in the wavelength range from 895 to 915 nm (tolerance range). The nominal wavelength, i.e. actual operating wavelength, of the 16 lasers is 903 nm.

The essential characteristics of this sensor include:

Vertical detection angle −15° to +15° with 2° spacing between scanning planes; horizontal detection angle 360°. The software includes a multibeam function with 16 beams for minimizing shadow effects. Horizontal resolution of the laser system is 0.1° to 0.4° depending on rotational velocity. The rotational velocity of vertical detection is adjustable between 5 to 20 Hz. At a data rate of 2 Mbyte/sec, 300 000 points/second are detected. The measurement accuracy achieved is about +/−3 cm, corresponding to 1 sigma. The detectable measuring distance is between 1 mm to 100 metres. The energy requirement of the sensor system is 8 watts of electrical power, corresponding to 0.7 A at 12 volts. The overall dimensions of the sensor are: diameter 100 mm and height 65 mm.

Method of Measurement

To reduce the scattered-light signals, the sensor head of the LiDAR sensor was shielded on the side away from the measurement path. Only lasers 1, 3, 5, 7, 8, 10, 12 and 14 were used. Furthermore, the field of view (FOV) of the sensor in the sensor interface was limited to 20° (350°-10°). The reflection surface used was a smooth white surface coated with $TiO_2$-containing paint. The wall was at a distance of 2.5 m from the LiDAR sensor.

The test specimens were tested by means of a sample holder parallel to the LiDAR sensor, with the reverse side of the samples being around 15 mm in front of the LiDAR sensor, so that both the output signal and the input signal returned had to pass through the wall thickness of the test sheet. Analysis was carried out using the "VeloView" software from the manufacturer of the LiDAR sensor, Velodyne.

A determination was made of the mean value of the intensities measured for a sample. This mean sample value was divided by the mean value of the reference measurement (air), so as to determine the relative intensity.

The measured intensities of the recorded laser signal were between 0% and 100%. The lower the attenuation (weakening) of the signal, and hence the higher the intensity of the signal measured, the more suitable the cover is classed for LiDAR-assisted sensor applications in the automotive sector. The transmission of the respective sheet for IR radiation in the range from 800 nm to 1600 nm was determined according to DIN ISO 13468-2:2006. The light transmission in the VIS region of the spectrum (380 to 780 nm, degree of transmission Ty) was determined according to DIN ISO 13468-2:2006 (D65, 10°, layer thickness of specimen sheet: 4 mm). The transmission measurements were performed using a Perkin Elmer Lambda 950 spectrophotometer with a photometer sphere.

Abrasion Testing:

The abrasion test took the form of a carwash test according to DIN ISO 15082:2017-06.

10 Double washes were performed with a stirred suspension of quartz flour in water (1.5 g of quartz flour per litre of water).

MVR:

Melt volume flow rate (MVR) was determined in accordance with ISO 1133-1:2012 (at a test temperature of 300° C., mass 1.2 kg) using the Zwick 4106 instrument from Zwick Roell. In addition MVR was measured after a preheating time of 5, 20 and 30 minutes. This is a measure of melt stability under elevated thermal stress.

Results

TABLE 1

Results of measurement for light transmission Ty (D65, 10°) (VIS) and LiDAR sensor suitability of the substrate layers

| Examples | Substrate material | Colorants and other components | Total colorant concentration [% by weight] | Ty [%] | Thickness [mm] | Intensity of the laser signal after passage through the substrate [%] |
|---|---|---|---|---|---|---|
| 1 comparative example | 1 | (7); (12) | 0.00016 | 88.1 | 5 | 70.8 |
| 2 comparative example | 2 | (2); further colorant | 0.2 | 0 | 2 | 24.9 |
| 3 comparative example | 3 | (17); (18); further colorant | 0.199 | 0 | 2 | 24.3 |
| 4 comparative example | 4 | Carbon black | 0.16 | 0 | 5 | 0 |
| 5 comparative example | 5 | (16); (12); $TiO_2$ | 0.00015 | 0 | 3.2 | 0 |
| 6 comparative example | 6 | Titanium dioxide; (10); further colorants; iron(III) oxide | 0.465 | 0 | 3.2 | 0 |
| 7 comparative example | 7 | — | 0 | 23.8 | 3.2 | 0 |
| 8 comparative example | 8 | Carbon black | 0.04 | 0 | 2.0 | 0 |
| 9 comparative example | 9 | Carbon black; (13) | 0.2 | 0 | 2.0 | 0 |
| 10 according to the invention | 10 | (4a/4b); (13); (17) | 0.126 | 0 | 2.0 | 71.7 |
| 11 according to the invention | 11 | (12); (1) | 0.2 | 0 | 4.0 | 69.6 |
| 12 according to the invention | 12 | 7/12 | 0.106 | 0.7 | 2.0 | 76.7 |
| 13 comparative example | 13 | — | — | 46 | 3.0 | 0 |
| 14 comparative example | 14 | — | — | 87 | 0.175 | 2.9 |
| 15 comparative example | 15 | — | — | 23 | 2.3 | 0 |
| 16 comparative example | 16 | — | — | 92.5 | 2.7 | 73.4 |

As is apparent from table 1 only certain substrate materials are suitable. Even very thin layer thicknesses of unsuitable materials, for example of polypropylene, attenuate the sensor signal to such an extent that an intensity was no longer measurable in the measuring setup. It was likewise surprising that different substrates such as polyamide (Ex. 16) and ABS (Ex. 17) showed no permeability to the LiDAR sensor in the measuring setup. All of these thermoplastics are transparent or at least semitransparent in the IR range in relevant layer thicknesses. Surprisingly, completely amorphous polymers such as polyethersulfone and polyester also exhibit a high attenuation for the LiDAR sensor.

Even modified polycarbonates such as siloxane-containing polycarbonates cannot be suitably combined with a LiDAR sensor.

It was furthermore entirely surprising that combinations of colorants soluble in a polycarbonate matrix in some cases also resulted in high attenuations of the LiDAR signal (examples 2 and 3). By contrast the inventive combination of colorants in the thermoplastic matrix of bisphenol A-based polycarbonate can be suitably combined with a LiDAR sensor.

In addition, the melt volume flow rate of a number of compositions was determined over a particular time interval according to ISO 1133-1:2011 at 300° C./320° C. at a loading of 1.2 kg (table 2). Is it apparent therefrom that the substrate materials 2 and 3 of the comparative examples are markedly more unstable than the inventive substrate material 11.

TABLE 2

MVR for the substrate materials 2, 3 and 11

|  | Substrate material 2 [cm³/(10 min)] | Substrate material 3 [cm³/(10 min)] | Substrate material 11 [cm³/(10 min)] |
|---|---|---|---|
| 300° C. | | | |
| after 5 min | 12.0 | 12.3 | 12.5 |
| after 20 min | 12.5 | 13.7 | 13.2 |
| after 30 min | 13.0 | 15.0 | 13.3 |
| 320° C. | | | |
| after 5 min | 21.5 | 22.3 | 21.9 |
| after 20 min | 24.8 | 30.1 | 23.0 |
| after 30 min | 26.5 | 34.7 | 23.5 |

TABLE 3

Results of measurement for the LiDAR sensor suitability of the protective layers

| Multilayer article Example | Substrate material | Thickness of multilayer article [mm] | Particle size $D_{90}$ in the coating system | Intensity after passage through the substrate |
|---|---|---|---|---|
| 1 | 11 | 3.2 | 4 µm | 24.6% |
| 2 | 11 | 3.2 | 1.2 µm | 36.8% |
| 3 | 11 | 3.2 | 22 nm | 67.1% |
| 4 | 11 | 3.2 | 22 nm | 74.2% |

The results were evaluated arithmetically.

TABLE 4

Transmissions of the multilayer articles in the IR range

| Multilayer article Example | Thickness Multilayer article [mm]* | Direct transmission at 905 nm | Total transmission at 905 nm | Direct transmission at 1550 nm | Total transmission at 1550 nm |
|---|---|---|---|---|---|
| 1 | 3.2 | 74.5% | 88.1% | 82.0% | 87.2% |
| 2 | 3.2 | 82.5% | 88.4% | 84.4% | 87.9% |
| 3 | 3.2 | 87.1% | 89.8% | 86.6% | 88.4% |
| 4 | 3.2 | 91.2% | 92.0% | 90.2% | 91.0% |

*corresponds essentially to the thickness of the substrate layer

For the tests on multilayer articles, a substrate material was selected which showed a high permeability to the LiDAR signal in the test. Various multilayer bodies were tested and investigated, being combinations which exhibited high permeability. It was found that the attenuation of the LiDAR signal is effected in particular by the size of the particles used in order to achieve good scratch resistance. High scratch resistance is important in order to reduce effects of weathering. It was found that only certain particle sizes in combination with suitable substrate materials are suitable for LiDAR sensors.

TABLE 5

Attenuation of the LiDAR signal before the abrasion test

| Multilayer article Example | Substrate material | Thickness Multilayer article [mm] | Intensity after passage through the substrate [%] |
|---|---|---|---|
| 5 (inv.) | 11 | 4 | 74.2 |
| 6 (inv.) | 11 | 4 | 69.6 |
| 7 (comp.) | 11 | 4 | 68.7 |

TABLE 6

Attenuation of the LiDAR signal after the abrasion test

| Arithmetic evaluation: Multilayer article Example | Substrate material | Thickness of multilayer article [mm] | Intensity after passage through the substrate | Delta |
|---|---|---|---|---|
| 5 (inv.) | 11 | 4 | 73.4% | 0.8 |
| 6 (inv.) | 11 | 4 | 68.7% | 0.9 |
| 7 (comp.) | 11 | 4 | 47.7% | 22.5 |

Multilayer articles of the invention still have a minimum signal of 65% after the abrasion test.

TABLE 7

Transmissions of the multilayer articles in the IR range

| Example | Thickness Multilayer article [mm] | Direct transmission at 905 nm | Total transmission at 905 nm | Direct transmission at 1550 nm | Total transmission at 1550 nm |
|---|---|---|---|---|---|
| 5 | 4 | 89.1% (91.2%) | 92.0% (92.0%) | 88.8% (90.2%) | 90.3% (91.0%) |
| 6 | 4 | 88.8% (91.1%) | 91.4% (91.9%) | 87.8% (88.8%) | 89.7% (89.6%) |
| 7 | 4 | 79.5% (88.8%) | 89.2% (89.7%) | 83.2% (87.5%) | 88.0% (88.4%) |

* The figures in brackets indicate the results before the carwash test.

It is found, completely surprisingly, that an organic coating system, including in particular one without nanoparticles, after the carwash test according to DIN ISO 15082:2017-06, exhibits greater attenuation for the LiDAR sensor.

The invention claimed is:

1. A sensor system comprising
   (a) a LiDAR sensor which emits laser light having a wavelength in the range from 800 to 1600 nm and
   (b) a cover surrounding all or part of the LiDAR sensor and configured as an element through which the laser light of the LiDAR system is emitted, the cover comprising a multilayer article comprising, in this order,
   (i) a substrate layer comprising a thermoplastic composition based on aromatic polycarbonate having a melt volume rate MVR of 8 to 20 cm$^3$/(10 min), determined according to ISO 1133-1:2012-03 (300° C., 1.2 kg),
   wherein the composition has a light transmission in the range from 380 to 780 nm of less than 25.0% determined at a layer thickness of 4 mm according to DIN ISO 13468-2:2006 (D65, 10°),
   and wherein the substrate layer in its respective thickness has a transmission for IR radiation in the range from 800 nm to 1600 nm of at least 40%, determined according to DIN ISO 13468-2:2006, and
   (ii) optionally a primer layer based on polymethyl methacrylate (PMMA) and comprising at least one UV absorber,
   (iii) a polysiloxane-based topcoat layer comprising a combination of an organically modified silane with a silica sol, the topcoat layer comprising silicon dioxide particles having a $D_{90}$, determined by means of scanning transmission electron microscopy, of less than 0.50 µm and comprising no further particles having a D90, determined by means of scanning transmission electron microscopy, ≥ 0.50 µm,
   wherein the topcoat layer is on the side of the substrate layer that is opposite the side of the substrate layer on which the LiDAR sensor is disposed, and
   wherein an intensity of the laser light emitted by the LiDAR sensor after passing through the multilayer article in its respective thickness following an abrasion test according to DIN ISO 15082:2017-06 and received by the LiDAR sensor after passing again through the multilayer article is at least 65%.

2. The sensor system according to claim 1, wherein the topcoat layer comprises at least one UV absorber from the group of benzophenones, resorcinols, 2-(2-hydroxyphenyl)benzotriazoles, hydroxyphenyl-s-triazines, 2-cyanoacrylates and/or oxalanilides.

3. The sensor system according to claim 1, wherein the organically modified silane is at least one methyltrialkoxysilane, a dimethyldialkoxysilane or a mixture thereof.

4. The sensor system according to claim 1, wherein the multilayer article comprises one or more primer layers having a thickness of in each case 0.3 µm to 8 µm, comprising at least one UV absorber from the group of benzophenones, resorcinols, 2-(2-hydroxyphenyl)bentriazoles, hydroxyphenyl-s-triazines, 2-cyanoacrylates, oxalanilides and/or sterically hindered amines (HALS).

5. The sensor system according to claim 1, wherein the cover comprises no layers other than the substrate layers (i), one or more topcoat layers (iii) and optionally one or more primer layers (ii).

6. The sensor system according to claim 1, wherein between the LiDAR sensor and the cover there is only air or an element that does not adversely affect the functional capacity of the LiDAR sensor.

7. The sensor system according to claim 1, wherein the topcoat layer comprises no particles other than the silicon dioxide particles.

8. The sensor system according to claim 1, wherein the $D_{90}$ of the silicon dioxide particles, determined by means of scanning transmission microscopy, is less than 50 nm.

9. The sensor system according to claim 1, wherein the multilayer article comprises, on both sides of the substrate layer, a topcoat layer (iii) and in each case optionally a primer layer (ii).

10. The sensor system according to claim 1, wherein the cover is a front panel, a rear panel, a bumper, a radiator grille, a vehicle roof, a vehicle roof module or a vehicle side element.

11. The sensor system according to claim 1, wherein the thermoplastic composition of the substrate layer comprises the following components:
    (iv) at least 70% by weight of aromatic polycarbonate,
    (v) at least one green and/or blue colorant and
    (vi) at least one red and/or violet colorant,
    (vii) optionally further colorants,
    wherein the sum of the colorants (v) to (vii) is at least 0.05% by weight and
    the at least one colorant of group (v) is a colorant selected from the group consisting of the colorants of formulae (1), (2a-c), (3), (4a), (4b), (5), (6), (7) and/or (8),

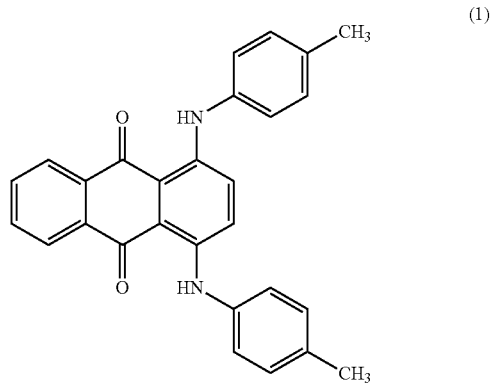 [SMILES: Cc1ccc(Nc2ccc(Nc3ccc(C)cc3)c3c2C(=O)c2ccccc2C3=O)cc1]

(1)

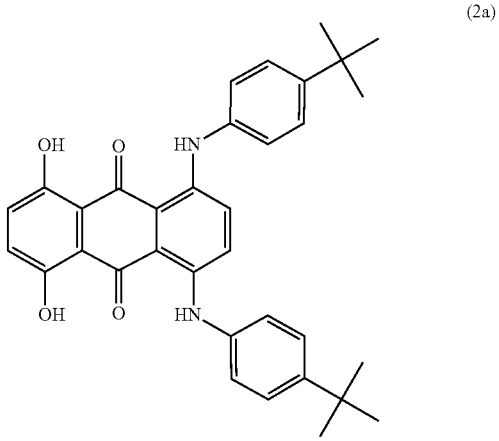

(2a)

-continued

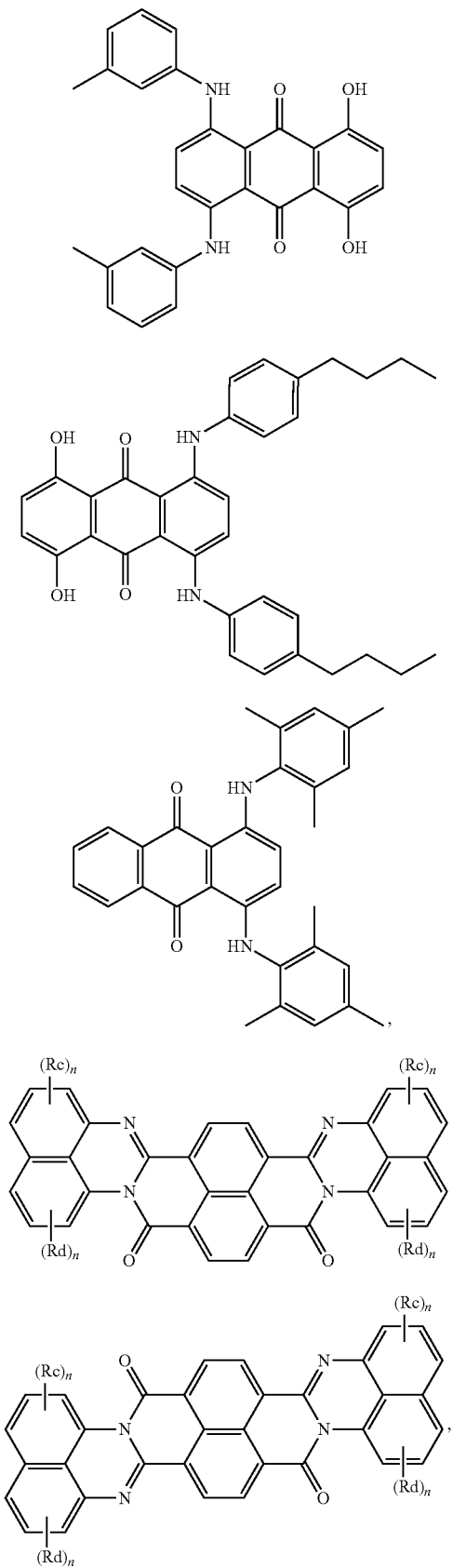

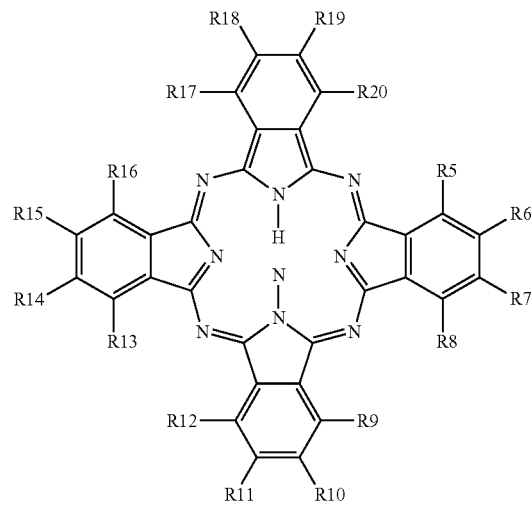

wherein
Rc and Rd independently of one another represent a linear or branched alkyl radical or halogen,
n independently of the respective R represents a natural number between 0 and 3,

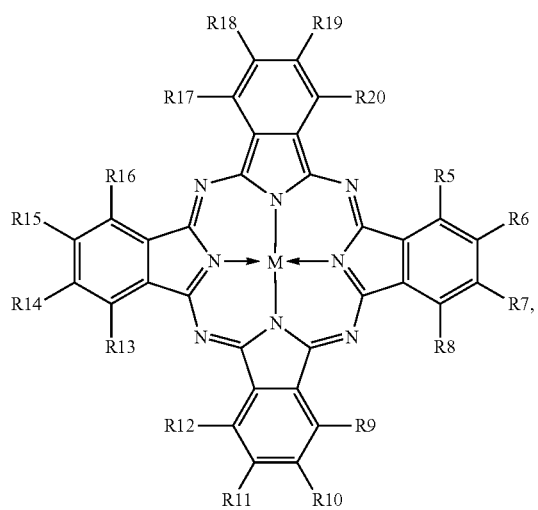

where the radicals R(5-20) independently of one another represent hydrogen, methyl, ethyl, propyl, isopropyl, butyl, isobutyl, tert-butyl, pentyl, neopentyl, hexyl, thexyl, fluoro, chloro, bromo, sulfone or CN and M is aluminum, nickel, cobalt, iron, zinc, copper or manganese,

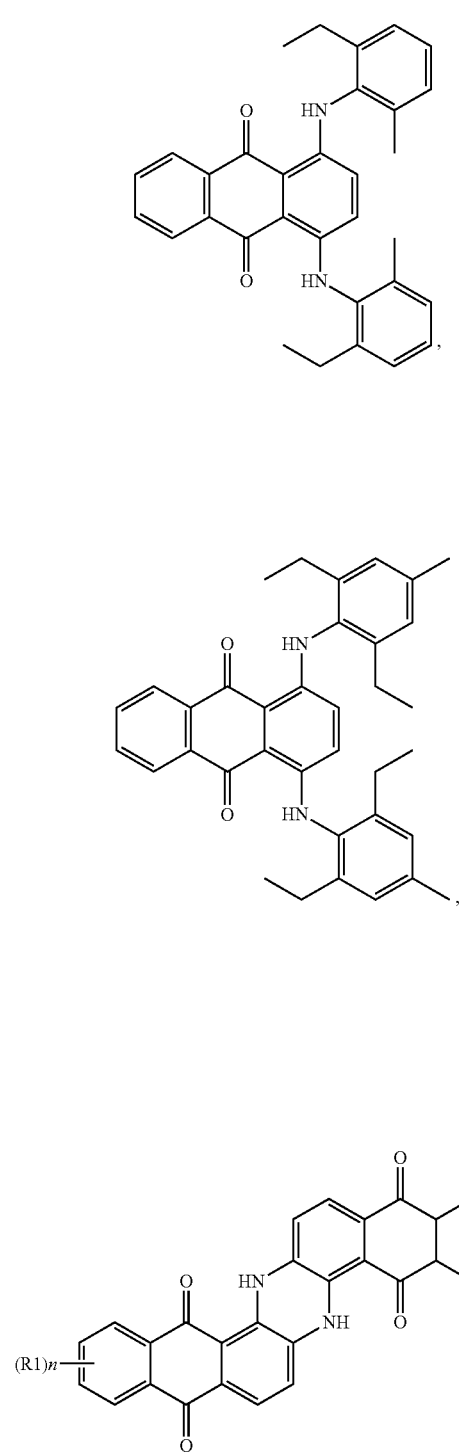
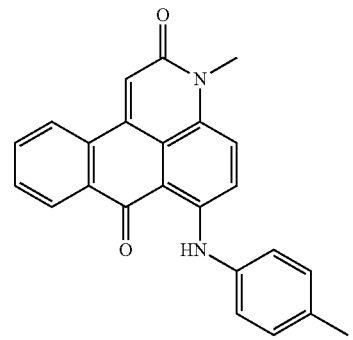
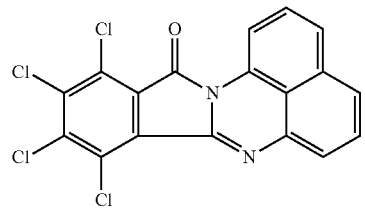
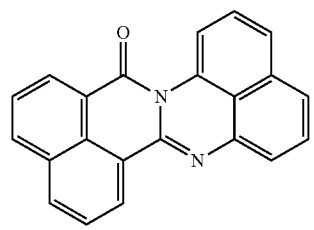
wherein
R1 and R2 independently of one another represent a linear or branched alkyl radical or halogen,
n is a natural number between 0 and 4,
and the at least one colorant of group (vi) is a colorant selected from the group consisting of the colorants of formulae (9), (10), (11), (12), (13), (14a), (14b) and/or (15),
wherein R is selected from the group consisting of H and p-methylphenylamine radical,

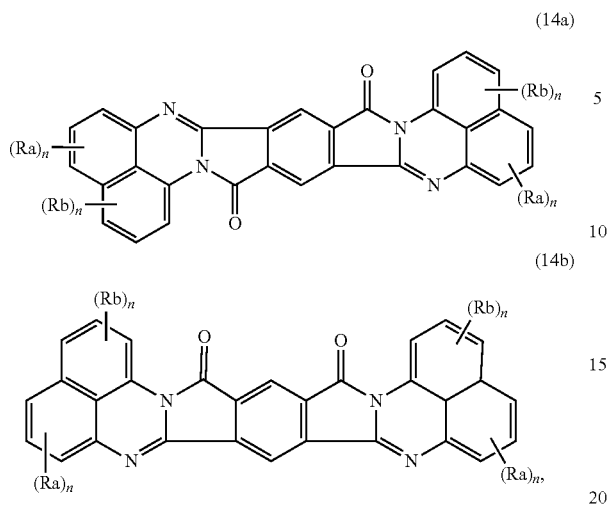
(14a)
(14b)

wherein
Ra and Rb independently of one another represent a linear or branched alkyl radical or halogen,
n independently of the respective R represents a natural number between 0 and 3,

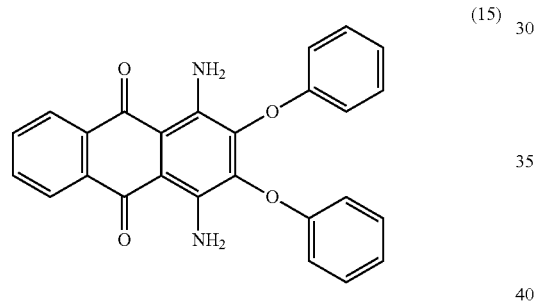
(15)

and
where the colorants of group (vii) are selected from the group consisting of the yellow and orange colorants of formulae (16), (17), (18), (19) and/or (20)

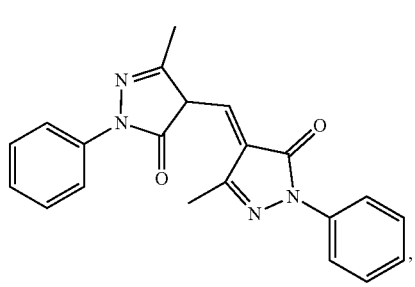
(16)

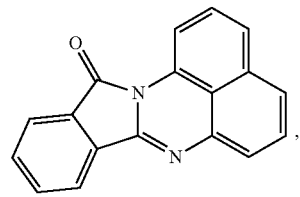
(17)

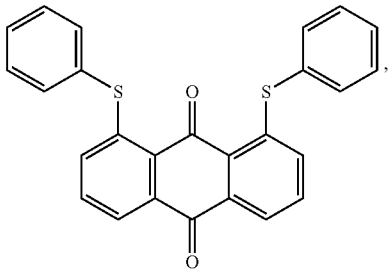
(18)

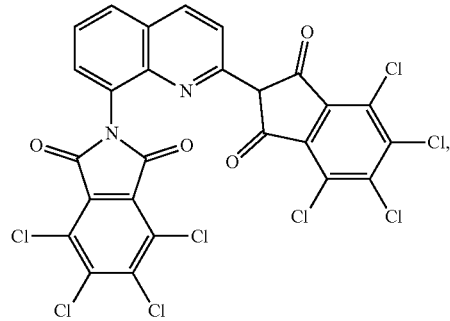
(19)

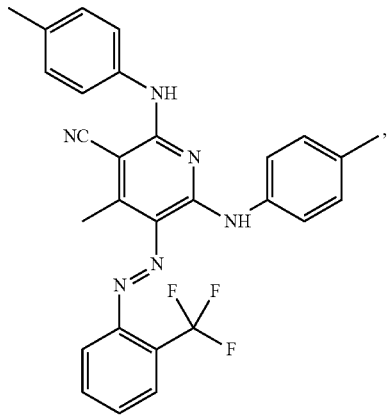
(20)

and wherein the composition comprises no colorants other than the colorants of groups (v) to (vii), (viii) optionally one or more additives selected from the group consisting of heat stabilizers, mould release agents, UV absorbers, flame retardants, antistats and/or flow improvers, (ix) 0% to less than 5.0% by weight of further thermoplastic polymers and (x) 0% to less than 0.005% by weight of carbon black, and where the thickness of the substrate layer is 1.0 to 6.0 mm.

12. The sensor system according to claim 11, wherein the sum of the colorants (v) to (vii) in the thermoplastic composition of the substrate layer is at least 0.10% by weight
and wherein the thermoplastic composition comprises no other thermoplastics.

13. The sensor system according to claim 11, wherein the composition of the substrate layer comprises no components other than components (iv)-(vi) and optionally one or more of components (vii)-(x).

14. A vehicle comprising the sensor system according to claim 1.

15. A method comprising applying a polysiloxane-based topcoat layer comprising a combination of an organically modified silane with a silica sol, the topcoat layer comprising silicon dioxide particles having a $D_{90}$, determined by means of scanning transmission electron microscopy, of less than 0.50 μm and comprising no further particles having a $D_{90}$, determined by means of scanning transmission electron microscopy, ≥0.50 μm, over a LiDAR sensor cover to form a coating layer of a multilayer article, wherein the cover is configured as an element through which laser light having a wavelength in the range from 800 to 1600 nm from the LiDAR sensor is emitted, and wherein an intensity of the laser light emitted by the LiDAR sensor after passing through the multilayer article in its respective thickness following an abrasion test according to DIN ISO 15082: 2017-06 and received by the LiDAR sensor after passing again through the multilayer article is at least 65%.

* * * * *